United States Patent
Mandal et al.

(10) Patent No.: US 12,405,861 B2
(45) Date of Patent: Sep. 2, 2025

(54) ADAPTIVE SCALING OF TOPICS IN A STATEFUL EVENT-DRIVEN PLATFORM

(71) Applicant: Hewlett Packard Enterprise Development LP, Spring, TX (US)

(72) Inventors: Vibhavari Mandal, Bangalore Karnataka (IN); Sanjaya Kumar Sahoo, Karnatak (IN); Tathagata Roy, Karnatak (IN); Asif Alam, Karnatak (IN); Brijesh Yadav, Karnatak (IN); Siddhartha Sahoo, Karnatak (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/655,422

(22) Filed: May 6, 2024

(65) Prior Publication Data
US 2024/0289232 A1    Aug. 29, 2024

(51) Int. Cl.
*G06F 12/00*    (2006.01)
*G06F 11/14*    (2006.01)
(52) U.S. Cl.
CPC ...... *G06F 11/1461* (2013.01); *G06F 2201/86* (2013.01)

(58) Field of Classification Search
CPC ............. G06F 11/1461; G06F 11/1446; G06F 2201/86; G06F 3/061; G06F 3/0644; G06F 3/0647; G06F 3/065
See application file for complete search history.

(56) References Cited

U.S. PATENT DOCUMENTS

| 6,532,498 B1 * | 3/2003 | Hager ..................... G06F 9/542 |
| | | 719/318 |
| 2007/0282979 A1 * | 12/2007 | Tuel .................... H04L 67/1027 |
| | | 709/219 |

* cited by examiner

*Primary Examiner* — Shawn X Gu
(74) *Attorney, Agent, or Firm* — Hewlett Packard Enterprise Patent Department

(57) ABSTRACT

A system facilitating scaling of topics is provided. During operation, the system can suspend a stateful application of a topic and a stateful backup topic on an event-driven platform. The topic corresponds to a stream of events associated with the application. The system can modify configuration at the platform to allow a new set of partitions of the topic and a new set of backup partitions of the backup topic. The system can identify a state of event records from the application in a previous backup partition and identify a new backup partition allocated to the application. If they are different, the system can transfer the state to the new backup partition. The system can resume the application for generating an updated state, which is maintained at the new backup partition, based on the state and subsequent event records associated with the application.

20 Claims, 17 Drawing Sheets

ADAPTIVE SCALING OF TOPICS IN A STATEFUL EVENT-DRIVEN PLATFORM

BACKGROUND

Event streaming is the practice of capturing data in real-time from sources in the form of streams of events; storing these event streams for later retrieval; processing and responding to the event streams; and routing the event streams to different destination technologies as needed. Event streaming ensures a continuous flow and interpretation of data so that the right information is at the right place, at the right time.

BRIEF DESCRIPTION OF THE FIGURES

In the figures, like reference numerals refer to the same figure elements.

DETAILED DESCRIPTION

Figure 1A:
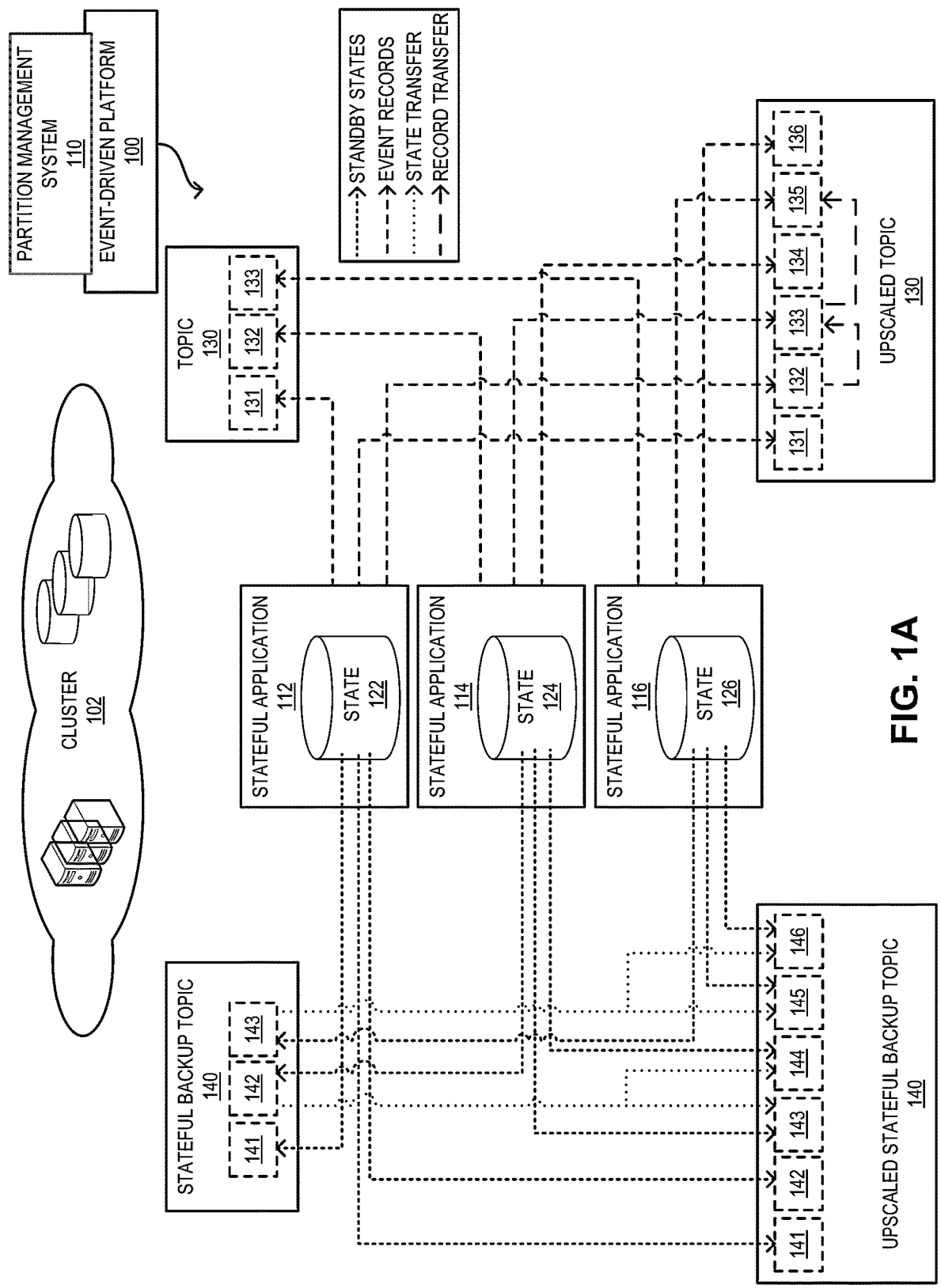
FIG. 1A illustrates an example of dynamic upscaling of a topic in an event-driven platform, in accordance with an aspect of the present application.

An event-driven platform, such as Apache Kafka, can dynamically incorporate records of events. The event-driven platform can also be referred to as an event-driven platform. An event can be an action detected and recorded by an application or software, such as a click on a website or a customer purchasing an item. The event-driven platform can be distributed on a cluster of servers. A respective type of event can be referred to as a topic. An event associated with a topic can be recorded on a corresponding record log. The record log can be maintained by the cluster. A producer application (e.g., an application on a client's website) can provide a record of an event to the event-driven platform, which, in turn, can add the record to the record log.

When the producer provides the record of an event, a key (e.g., an application identifier or ID, such as a producer ID) is associated with the record. A consumer application can subscribe to a topic and receive the records associated with the topic. The producer and consumer applications can be referred to as producers and consumers, respectively. Collectively, producers and consumers can be referred to as streams applications. To facilitate scaling and parallelism, a topic can be divided into a set of partitions, each of which can run on a different entity of the cluster. A respective partition can maintain a subset of the event records associated with the topic. A hash of the record key can be used to index the partition. Typically, applications can send records to a particular partition selected based on the hash function.

In addition, a respective application can determine a state from the records (e.g., a count or an aggregation of the event records) generated by the application. Consequently, such an application can be considered "stateful" due to the maintenance of the producer's state and can be referred to as a stateful application. A stateful application may operate without streaming events to the event-driven platform. To facilitate a backup of the state, the event-driven platform can maintain a stateful backup topic, which can be internal to the event-driven platform. The event-driven platform can then divide the stateful backup topic to generate and maintain respective backup partitions corresponding to the set of partitions. If the records generated by the producer are stored in the nth partition, the state generated by the producer is maintained in the nth backup partition. Therefore, the nth backup partition can maintain a backup state of the producer that can send event records to the nth partition.

For example, if the event-driven platform is based on Kafka, the state can be a StateStore generated by the stateful applications. The stateful backup topic can then be a ChangeLog topic internally maintained by Kafka. The corresponding partition of the ChangeLog topic can maintain a backup of a StateStore of the application. If the number of partitions (or partition count) of a topic changes, the topic can be repartitioned to generate a set of new partitions. Accordingly, the event-driven platform can dynamically create a new set of backup partitions corresponding to the new partitions.

The aspects described herein address the problem of dynamically scaling a topic configured on the event-driven platform by (i) redistributing the backup states among the upscaled new backup partitions such that the new backup partition corresponding to a stateful application can store a backup state of the; and (ii) transferring the record log and backup state of a stateful application to corresponding downscaled new partitions via temporary topics. For both upscaling and downscaling, a partition identifier of the new partition and new backup partition is determined based on the hash function for a respective state (e.g., based on its corresponding stateful application) of the topic. As a result, for upscaling, if a stateful application is to add records to the nth new partition, the backup state associated with the stateful application is placed in the nth new backup partition. For downscaling, if a stateful application is to add records to the nth new partition, the record log of the stateful application is placed in the nth new partition via the nth temporary partition of a temporary topic. Similarly, the stateful backup state of the stateful application is placed in the nth new backup partition via the nth temporary stateful backup partition of a temporary stateful backup topic.

With existing technologies, an event-driven platform, such as Kafka, can divide a topic into a plurality of partitions. In particular, the volume of data from the stateful applications can vary, which may lead to adjustment of resource allocation to corresponding topics. For example, the stateful applications associated with the topic can continue to add event records to the topic in real time. Consequently, the volume of data associated with the topic may continue to increase. The partition count (e.g., the number of partitions) associated with the topic can determine the number of stateful applications (i.e., consumers) that may access (e.g., either read or write) the topic. A higher number of stateful applications can enable parallel data processing, which may improve the scalability of the topic. Therefore, to allow the event-driven platform to scale up to enhance the throughput, the number of partitions may be dynamically increased.

On the other hand, the event records from the stateful applications associated with the topic may also be reduced. For example, some stateful applications may cease to operate, which can reduce the rate of event records arriving at the topic. The rate of event records generated by a stateful application may also be reduced. Consequently, the volume of data associated with the topic may decrease at a lower rate than anticipated. As a result, the level of parallelism facilitated by the partitions associated with the topic can be overprovisioned. Therefore, to ensure efficient utilization of the resources allocated to the topic, the number of partitions may be dynamically scaled down (or decreased).

A hash function can be used to determine which stateful application may add records to which partition. The hash function can be applied to a key, such as an application ID (e.g., a producer ID), to determine the index of the partition. If the number of partitions of the topic is changed, the hash function can result in a new partition for a stateful application. For example, if the topic is divided into four partitions, the hash function can select an index from four values. If the number of partitions is upscaled to six, the hash function can select an index from six values. On the other hand, if the number of partitions is downscaled to three, the hash function can select an index from three values. As a result, when a topic is scaled up or down, the hash function may allocate a new partition to the stateful application. The index for the new partition can be different from the previous partition.

If the topic is upscaled, the event-driven platform may increase the number of partitions of the topic. When the upscaling is complete, the stateful application may start sending records to the new partition. The event-driven platform can then transfer the record log from the previous partition to the new partition. In this way, the event-driven platform can dynamically redistribute the record logs so that the hash function can match the stateful application with the partition storing the corresponding record.

Furthermore, during the repartitioning, the stateful applications associated with the topic can be suspended. When the stateful applications are resumed, a respective stateful application can rely on the corresponding backup partition as the source of the state because the backup partitions can maintain backup copies of the states (i.e., backup states). However, the newly created backup partitions may be empty. Therefore, the backup state associated with the stateful application may not be available at the new corresponding backup partition. Consequently, the record logs and the corresponding state are not stored based on the same index. Therefore, the existing state may become unavailable to the stateful applications. The event-driven platform may need to perform extensive computations to reconstruct the state, which can be inefficient and time intensive.

Moreover, if the topic is to be downscaled, some event-driven platforms, such as Kafka, may not support the downscaling operation. As a result, a configuration command supported by the event-driven platform may not be available to an administrator to perform a downscaling operation on a topic. Therefore, to reduce the number of partitions of a topic, a new topic can typically be defined with the reduced number of partitions. However, the record logs maintained in the original topic and states maintained in the corresponding stateful backup topic are to be manually transferred to the new topic and the stateful new backup topic by an administrator. Furthermore, the stateful applications associated with the topic can already be in communication with the original topic. Hence, the stateful applications need to be reconfigured with the new topic. Transferring data between topics and configuring the stateful applications can be tedious, inefficient, and error prone.

To address this issue, a partition management system operating in conjunction with the event-driven platform can dynamically scale a topic. During operation, the system can suspend the stateful applications (e.g., stateful consumer applications) associated with the topic and read from the old backup partitions. Since the stateful applications associated with a topic can write to or read from the partitions, the suspension allows the system to scale the topic (e.g., increase or decrease the number of partitions of the topic). To upscale the topic, the system may configure the event-driven platform to change the number of partitions. The configuration can be executed based on a command provided to the event-driven platform. The command can include the name or identifier of the topic and the new number of partitions.

Based on the configuration, the event-driven platform can increase the number of partitions. To match the new number of partitions, the event-driven platform can internally increase the number of backup partitions to store corresponding backup states. The system can then redistribute the backup states so that the hash function can match the stateful applications with the new backup partition storing the backup state. Accordingly, the system can generate a partition identifier of the new backup partition for a respective state. A respective partition identifier can correspond to an index generated by the hash function associated with the stateful applications. For example, if the number of partitions is increased from three to six, the partition identifiers can be from zero to five. The hash function applied to determine the new backup partition for a stateful application can be the same hash function applied to determine the new partition.

Upon upscaling the topic, the system can resume the stateful applications associated with the topic. When the hash function is applied to a resumed stateful application, the corresponding index can indicate the new partition to which the stateful application is going to send subsequent records. The same index can further indicate the new backup partition from which the stateful application is going to retrieve the backup state. In addition, to ensure consistency, the same hash function can be used before and after the repartitioning. In other words, prior to the repartitioning, the same hash function might determine the previous partition allocated to the stateful application.

For a stateful application and its state, if the partition identifiers of the old and new backup partitions are different, the state is stored in the new backup partition. This ensures that if the stateful application is to add records to the nth new partition, the old state associated with the stateful application is placed in the nth new backup partition. When the transfer is complete, the system can resume the operations of the stateful applications. When the stateful application adds new records to the nth partition, the event-driven platform can obtain the record log associated with the stateful application and place it in the nth partition. Hence, the new records can be incorporated into the record log.

Moreover, the stateful application may update the state based on the new records. To do so, the stateful application can identify the new backup partition associated with the stateful application based on the hash function. Since the backup state has been transferred to the new backup partition, the stateful application can discover the state associated with the stateful application and retrieve the state. The stateful application can then incorporate the new records into the state. The updated state can then be automatically backed up by the event-driven platform in the new backup partition. In this way, even after the topic is dynamically upscaled, a stateful application can obtain the backup state and continue to update the state with new records.

On the other hand, to downscale the topic, the system can determine the reduced number of partitions of the topic and create a corresponding temporary topic and a temporary stateful backup topic with the reduced number of partitions. For example, if the number of partitions of the topic is four and is to be reduced to three, the temporary topics are created with three partitions. For a respective stateful application associated with the topic, the system can apply the hash function to the key associated with a state of the stateful application for determining an index. Based on the index, the system can identify a temporary partition of the temporary topic and a corresponding temporary backup partition of the temporary stateful backup topic. The system can then transfer the record log of the stateful application from the current partition of the topic to the temporary partition. The system can also transfer the state associated with the stateful application from the current backup partition of the stateful backup topic to the temporary backup partition.

Based on the transfer, the system can maintain respective copies of record logs and states in the temporary topics. Since the copies of record logs and states are preserved at the temporary topics, the system can delete or remove the topic and the corresponding stateful backup topic from the event-driven platform. For example, if the event-driven platform is based on Kafka, the system can remove the topic and the corresponding ChangeLog topic from Kafka. Deleting the topic and stateful backup topic can free the topic identifier, such as the topic name, at the event-driven platform. The system can then generate (or create) the topic and the corresponding stateful backup topic with the reduced number of partitions. The downscaled topics can have the same topic identifier (or name). The system can then determine respective partition identifiers for the stateful applications.

Because the temporary topic and the downscaled topic have the same number of partitions, they have a one-to-one correspondence. Accordingly, the system can transfer the record logs from a temporary partition to a corresponding new partition of the downscaled topic. In the same way, the system can transfer the states from a temporary backup partition to a corresponding new backup partition of the regenerated stateful backup topic. In other words, the system can transfer from the nth temporary partition to the nth new partition and from the nth temporary backup partition to the nth new backup partition. In this way, the system can regenerate the topics with the reduced number of partitions and populate the partitions in such a way that the record logs and states are readily available to the stateful applications.

Upon downscaling the topic, the system can resume the stateful applications associated with the topic. When a resumed stateful application adds subsequent records to the new partition of the downscaled topic, the new records are added to the record log in the new partition. In the same way, since the backup state has been transferred to the new backup partition, the stateful application can discover the state associated with the stateful application and retrieve the state. The stateful application can then incorporate the new records into the state. The updated state can then be automatically backed up by the event-driven platform in the new backup partition.

In this disclosure, the term "message" refers to a group of bits that can be transported together across a network. "message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of dynamic upscaling of a topic in an event-driven platform, in accordance with an aspect of the present application. An event-driven platform 100 can dynamically incorporate records of events from a number of stateful applications 112, 114, and 116. These applications may or may not be streams applications operating in conjunction with event-driven platform 100. An event can be a computer-detectable action, such as a click on a website or a customer purchasing an item. A respective stateful application can be an application that can send a message comprising respective records of one or more events to event-driven platform 100. Event-driven platform 100 can be distributed on cluster 102. Cluster 102 can include a plurality of computing devices, such as servers, and storage devices, such as persistent storage arrays. Typically, upon receiving a message, event-driven platform 100 can add the record of an event (or event record) indicated in the message to an event log stored in a persistent storage of cluster 102.

A respective type of event being stored at event-driven platform 100 can be referred to as a topic. Suppose that a topic 130 is defined in event-driven platform 100. Stateful applications 112, 114, and 116 can be associated with topic 130. Therefore, a respective event associated with topic 130 from stateful applications 112, 114, and 116 can be recorded on a record log of topic 130. The record log can be maintained by event-driven platform 100 in cluster 102. The resources allocated for storing topic 130 can be managed by event-driven platform 100. To facilitate scaling and parallelism, topic 130 can be divided into a set of partitions 131, 132, and 133, each of which can run on a different entity of cluster 102. The event records from a particular stateful application are maintained at one of partitions 131, 132, and 133. Therefore, a respective partition may maintain respective event logs of an exclusive set of stateful applications.

For example, when stateful application 112 sends a message comprising the record of an event to event-driven platform 100, a key (e.g., an identifier of stateful application 112) is associated with the record. A hash of the key can be used to generate an index that can select one of partitions 131, 132, and 133. In this example, partitions 131, 132, and 133 can be selected for storing record logs of stateful applications 112, 114, and 116, respectively, based on the hashing. A hash function can be used to determine the index. The hash function can use the key and the number of partitions as inputs and generate an index as an output. If the number of partitions is N, the index value can fall within a range of [0, N]. A consumer application can subscribe to topic 130 and receive the records associated with topic 130.

Furthermore, stateful applications 112, 114, and 116 can determine states 122, 124, and 126, respectively, from their records. For example, if stateful application 112 calculates the sales volume of an online shop, the event records can indicate revenue generated from individual sales, and state 122 can then be the total revenue generated. Consequently, stateful applications 112, 114, and 116 can be considered as "stateful applications" due to the maintenance of states 122, 124, and 126, respectively. To facilitate a backup of states 122, 124, and 126, event-driven platform 100 can maintain a stateful backup topic 140, which can be internal to event-driven platform 100. To maintain consistency with topic 130, event-driven platform 130 can divide stateful backup topic 140 to generate backup partitions 141, 142, and 143.

Backup partitions 141, 142, and 143 can correspond to partitions 131, 132, and 133, respectively. Therefore, for each of stateful applications 112, 114, and 116, the same index can be used to select one of partitions 131, 132, and 133 and one of backup partitions 141, 142, and 143. Accordingly, since the event records generated by stateful application 112 can be stored in partition 131, a backup copy of state 122 generated by stateful application 112 can be maintained in backup partition 141. In the same way, respective backup copies of states 124 and 126 can be maintained in backup partitions 142 and 143, respectively. If stateful application 112 becomes unavailable (e.g., due to an error or an upgrade), stateful application 112 can retrieve the backup copy of state 122 from backup partition 141.

Here, if event-driven platform 100 is based on Kafka, states 122, 124, and 126 can be StateStores generated by stateful applications 112, 114, and 116, respectively. Stateful backup topic 140 can then be a ChangeLog topic internally maintained by Kafka. Partitions 141, 142, and 143 of the ChangeLog topic can maintain a backup copy of StateStores 122, 124, and 126, respectively. If the number of partitions of topic 130 changes due to upscaling or downscaling, topic 130 can be repartitioned to generate a set of new partitions. Accordingly, event-driven platform 100 can dynamically create a new set of backup partitions of stateful backup topic 140 corresponding to the new partitions.

With existing technologies, stateful applications 112, 114, and 116 can continue to add event records to topic 130 in real time. Consequently, the volume of data associated with topic 130 may continue to increase. Because topic 130 has been divided into three partitions (i.e., partitions 131, 132, and 133), there can be three stateful applications (i.e., consumers) that can access topic 130. A higher number of stateful applications can enable parallel data processing, which may improve the scalability for topic 130. Therefore, to allow event-driven platform 100 to scale up to enhance the throughput, the number of partitions of topic 130 may be dynamically increased.

On the other hand, the event records from stateful applications 112, 114, and 116 may also be reduced. For example, one of stateful applications 112, 114, and 116 can stop operations. Consequently, the rate of event records arriving at topic 130 can decrease as well. Furthermore, the rate of event records generated by a stateful application, such as stateful application 116, may also be reduced, and the volume of data associated with topic 130 may decrease. As a result, the level of parallelism facilitated by partitions 131, 132, and 134 can be overprovisioned. Therefore, to ensure efficient utilization of the resources of cluster 102 allocated to topic 130, the number of partitions may be dynamically scaled down (or decreased).

If the topic is upscaled, event-driven platform 100 may increase the number of partitions of topic 130. Suppose that the number of partitions of topic 130 is increased to six. An administrator may issue a configuration command to event-driven platform 100 to upscale topic 130 to six. The command can be supported by event-driven platform 100 and include the name or identifier of topic 100 and the new number of partitions (e.g., six) as inputs. Accordingly, event-driven platform 100 can then generate partitions 131, 132, 133, 134, 135, and 136 for topic 130. To match the new number of partitions, event-driven platform 100 can internally upscale stateful backup topic 140 and generate backup partitions 141, 142, 143, 144, 145, and 146 for stateful backup topic 140. Before the upscaling, the hash function can produce an index from three values. When the number of partitions is upscaled to six, the hash function can select an index from six values. As a result, when topic 130 is upscaled, the hash function may allocate a new partition to a stateful application. The index for the new partition can be different from the previous partition.

For example, before the upscaling, when the hash function is applied for stateful application 112, the index can correspond to partition 131. After the upscaling, the index may still correspond to partition 131. On the other hand, before the upscaling, when the hash function is applied for stateful application 114, the index can correspond to partition 132. Accordingly, when the upscaling is complete, stateful application 114 may start sending records to partition 133. Event-driven platform 100 can then transfer the record log from partition 131 to partition 133. In this way, event-driven platform 100 can dynamically redistribute the record logs so that the hash function can match the stateful application with the partition storing the corresponding record.

Furthermore, during the upscaling of topic 130, stateful applications 112, 114, and 116 can be suspended. When stateful applications 112, 114, and 116 are resumed, a respective stateful application can rely on the corresponding backup partition as the source of states 122, 124, and 126. However, newly created backup partitions 141, 142, 143, 144, 145, and 146 may be empty. Therefore, the backup copies of states 122, 124, and 126 may not be available at the new backup partitions. Consequently, states 122, 124, and 126 may not be readily available to stateful applications 112, 114, and 116, respectively. Event-driven platform 100 may need to perform extensive computations to reconstruct states 122, 124, and 126, which can be inefficient and time intensive.

To address this issue, a partition management system 110 operating in conjunction with event-driven platform 100 can dynamically upscale topic 130. Respective instances of system 110 can operate with stateful applications 112, 114, and 116 to facilitate the efficient scaling of topic 130. In some examples, the instances of system 110 may be collocated with stateful applications 112, 114, and 116 (e.g., operate on the same computing system) and may operate as a root user on these applications. During operation, the system can suspend stateful applications 112, 114, and 116 and read from partitions 141, 142, and 143. When event-driven platform 100 increases the number of partitions of topic 130, event-driven platform 100 can internally increase the number of backup partitions of stateful backup topic 140. System 110 can then redistribute the backup copies of states 122, 124, and 126 so that the hash function can match them with stateful applications 112, 114, and 116.

Accordingly, system 110 can generate respective partition identifiers (or partition numbers) for states 122, 124, and 126 (e.g., based on the key associated with stateful application 112, 114, and 116, respectively). The partition identifier can identify backup partitions from partitions 141, 142, 143, 144, 145, and 146. A respective partition identifier can correspond to an index generated by the hash function. Since the number of partitions has increased to six, the partition identifiers can be from zero to five. The partition identifiers can correspond to the indices generated by the hash function. If the indices generated for stateful application 114 are zero and one, partitions 141 and 142 are selected for stateful application 112. Therefore, when the hash function is applied to stateful application 112, the corresponding indices zero and one can identify partitions 131 and 132, to which stateful application 112 is going to send subsequent event records. The same indices can further indicate partitions 141 and 142, from which stateful application 112 is going to retrieve the backup of state 122. In addition, to ensure consistency, the same hash function can be used before and after the scaling.

In the same way, for stateful application 114, the hash function can select partitions 133 and 134 of upscaled topic 130 and partitions 143 and 144 of upscaled stateful backup topic 140. Here, the partition identifiers of old backup partition 142 and new backup partitions 143 and 144 for state 124 can be different. Therefore, system 110 can transfer state 124 from old backup partition 142 to new backup partitions 143 and 144. Moreover, for stateful application 116, the hash function can select partitions 135 and 136 of upscaled topic 130 and partitions 145 and 146 of upscaled stateful backup topic 140. Here, the partition identifiers of old backup partition 143 and new backup partitions 145 and 146 for state 126 can be different. Therefore, system 110 can transfer state 126 from old backup partition 143 to new backup partitions 145 and 146.

When the transfer of states 124 and 126 is complete, stateful applications 112, 114, and 116 can be resumed. If stateful application 114 updates state 124 based on new records, stateful application 114 can identify new backup partition 143 based on the hash function. Since the backup copy of state 124 has been transferred to new backup partition 143, stateful application 114 can discover state 124 and retrieve it. Stateful application 114 can then incorporate the new records into state 124. The updated state can then be automatically backed up by event-driven platform 100 in new backup partitions 143 and 144. In this way, even after topic 130 is dynamically upscaled, stateful application 114 can obtain state 124 and continue to update state 124 with new records.

Figure 1B:
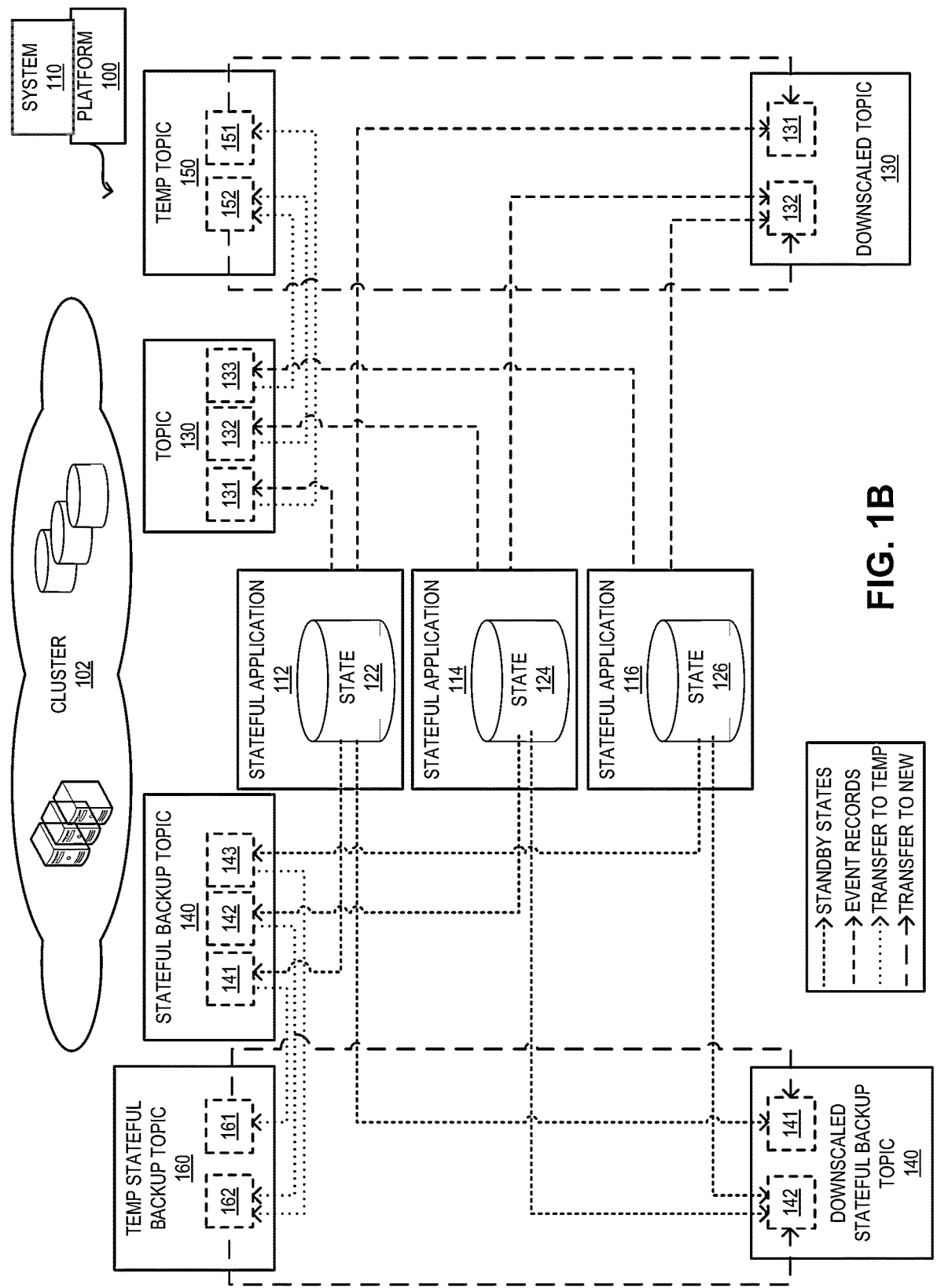
FIG. 1B illustrates an example of dynamic downscaling of a topic in an event-driven platform, in accordance with an aspect of the present application.

FIG. 1B illustrates an example of dynamic downscaling of a topic in an event-driven platform, in accordance with an aspect of the present application. If the topic is to be downscaled, event-driven platform 100 may not support a downscaling operation. In other words, event-driven platform 100 may not be equipped with a command that can downscale topic 130. Therefore, to reduce the number of partitions of topic 130, a new topic can typically be defined with the reduced number of partitions. However, the record logs maintained in topic 130 and copies of states 122, 124, and 126 maintained in stateful backup topic 140 are to be manually transferred to the new topic and the stateful new backup topic by an administrator. Furthermore, stateful applications 112, 114, and 116 can already be in communication with topic 130. Hence, stateful applications 112, 114, and 116 need to be reconfigured with the new topic. Transferring data between topics and configuring stateful applications 112, 114, and 116 can be tedious, inefficient, and error prone.

To address this issue, to downscale topic 130, system 110 can determine the reduced number of partitions. System 110 can then create a corresponding temporary topic 150 and a temporary stateful backup topic 160 with two partitions. In this example, the number of partitions of topic 130 can be three and is to be reduced to two. Therefore, temporary topic 150 can be created with two partitions 151 and 152, and temporary stateful backup topic 160 can be created with two partitions 161 and 162. The system can then apply the hash function to the respective application IDs of stateful applications 112, 114, and 116 and determine corresponding indices. Suppose that the indices for stateful applications 112, 114, and 116 are zero, one, and one, respectively. Accordingly, system 110 can select temporary partition 151 and temporary backup partition 161 for stateful application 112, and temporary partition 152 and temporary backup partition 162 for stateful applications 114 and 116.

System 110 can then transfer the record log of stateful application 112 from partition 141 to temporary partition 151, and the copy of state 122 from backup partition 141 to temporary backup partition 161. Similarly, system 110 can transfer the record log of stateful application 114 from partition 142 to temporary partition 152, and the copy of state 124 from backup partition 142 to temporary backup partition 162. System 110 can also transfer the record log of stateful application 116 from partition 143 to temporary partition 152, and the copy of state 126 from backup partition 143 to temporary backup partition 162. Based on the transfer, system 110 can preserve respective copies of record logs and states in temporary topics 150 and 160.

System 110 can then delete or remove topic 130 and stateful backup topic 140 from event-driven platform 100. For example, if event-driven platform 100 is based on Kafka, system 110 can remove topic 130 and ChangeLog topic 140 from Kafka. Deleting topic 130 and stateful backup topic 140 can free the topic identifier, such as the topic name, at event-driven platform 100. System 110 can generate topic 130 and stateful backup topic 140 with two partitions. In this way, system 110 can regenerate downscaled topic 130 and downscaled stateful backup topic 140, where they are scaled down from three partitions to two partitions. Here, downscaled topic 130 can have the same topic identifier (or name) as the original topic 130. For a respective stateful application, system 110 can determine partition identifiers of the partitions of topics 130 and 140, which can correspond to the indices generated by the hash function. Here, the partition identifiers for partitions 141 and 142 in downscaled backup partition 140 can be zero and one.

Because temporary topic 150 and downscaled topic 130 have the same number of partitions, the partitions of topics 130 and 150 have a one-to-one correspondence. Accordingly, system 110 can transfer record logs from temporary partitions 151 and 152 to partitions 131 and 132 of downscaled topic 130, respectively. In the same way, system 110 can transfer the states from temporary backup partitions 161 and 162 to backup partitions 141 and 142 of downscaled stateful backup topic 140. In this way, system 110 can regenerate topics 130 and 140 with the reduced number of partitions and populate their respective partitions in such a way that the record logs and states are available to stateful applications 112, 114, and 116.

Upon downscaling topic 130, system 110 can resume stateful applications 112, 114, and 116. Since downscaled topic 130 can be generated based on the same topic identifier or topic name on event-driven platform 100, stateful applications 112, 114, and 116 can readily access downscaled topic 130 without requiring application-level reconfiguration. Hence, when resumed stateful application 116 adds subsequent records to partition 132 of downscaled topic 130, the new records are added to the record log of stateful application 116 in partition 132. In the same way, since the backup copy of state 126 has been transferred to backup partition 142, stateful application 116 can discover state 126 and retrieve it. Stateful application 116 can then incorporate the new records into state 126. The updated state 126 can then be automatically backed up by event-driven platform 100 in partition 142 of downscaled stateful backup topic 140.

Figure 2A:
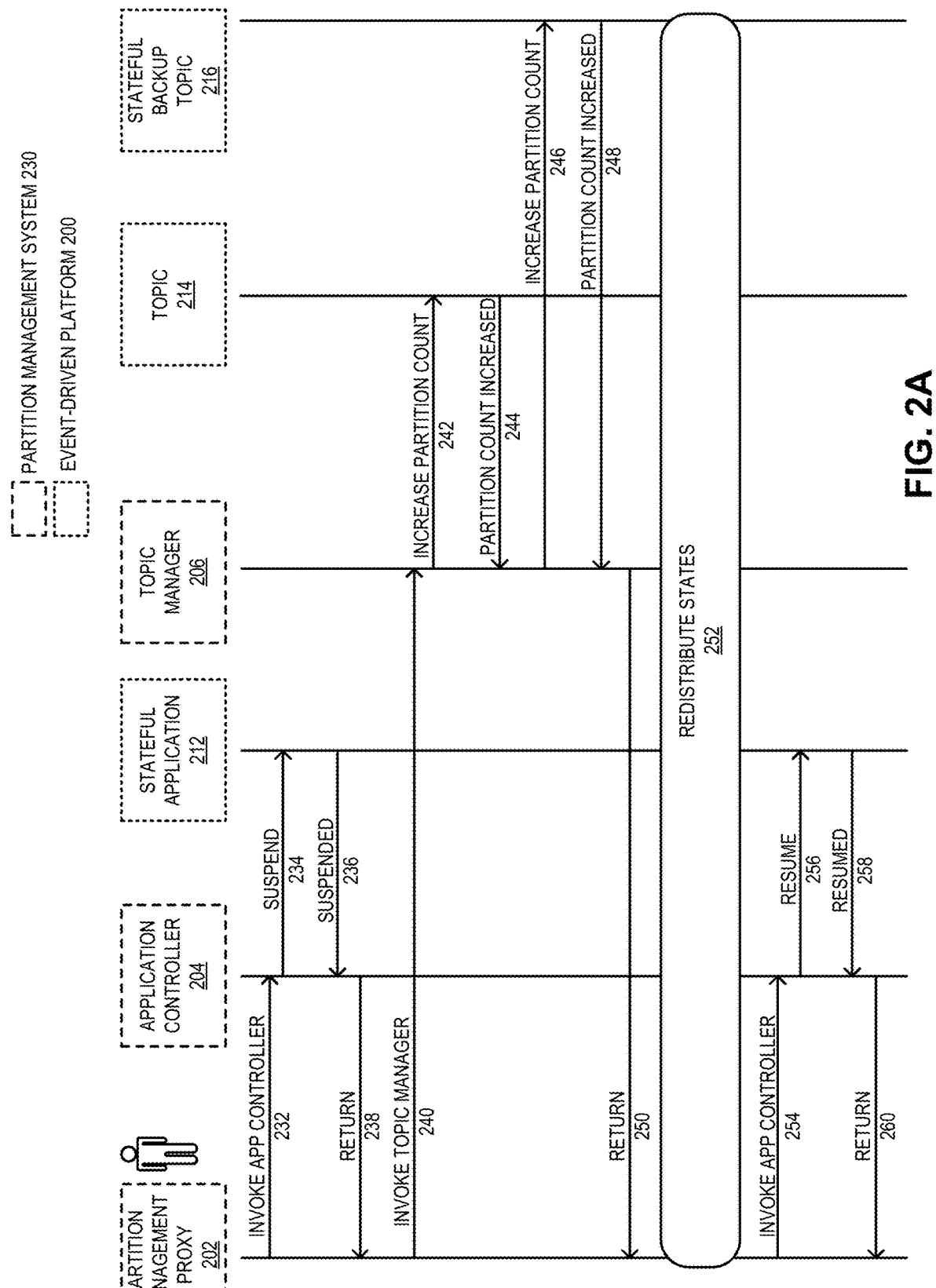
FIG. 2A illustrates an example of a partition management system increasing the number of partitions of a topic in an event-driven platform, in accordance with an aspect of the present application.

FIG. 2A illustrates an example of a partition management system increasing the number of partitions of a topic in an event-driven platform, in accordance with an aspect of the present application. A topic 214 can be defined on an event-driven platform 200. A stateful application 212 can be associated with topic 214. Stateful application 212 can be a producer that sends a set of messages to topic 214 to store a stream of event records. Stateful application 212 can be a stateful application that can maintain a state (e.g., a Kafka StateStore) determined based on the event records. To maintain a backup copy of the state, event-driven platform 200 can internally generate a stateful backup topic 216.

A partition management system 230 can operate in conjunction with event-driven platform 200 to facilitate upscaling and downscaling of topic 214. System 230 can operate with stateful application 212 to facilitate the efficient scaling of topic 214. In some examples, system 230 may be collocated with stateful application 212 and may operate as a root user of stateful application 212. System 230 can include a partition management proxy 202, an application controller 204, and a topic manager 206.

Proxy 202 can facilitate an interface between a user (e.g., an administrator managing topic 214) and system 230.

Proxy 202 may invoke a respective other component of system 230 used for scaling topic 214. The user can provide a command to upscale topic 214 via proxy 202. The command can include the topic identifier or name of topic 214 and the increased number of partitions for topic 214. Proxy 202 may present a user interface to the user to obtain the command. Examples of the user interface can include, but are not limited to, a textual interface, a graphical user interface (GUI), a movement-based interface, a gesture-based interface, a virtual or augmented reality interface, and a touch interface.

Application controller 204 can suspend and resume a respective stateful application associated with topic 214. Furthermore, topic manager 206 can manage the repartitioning (or altering) topic 214 and stateful backup topic 216. Topic manager 206 can interact with event-driven platform 200 using an application programming interface (API) supported by event-driven platform 200. For example, if event-driven platform 200 is based on Kafka, the API can include Kafka administrative APIs. During operation, upon receiving the command from the user, proxy 202 can invoke application controller 204 (operation 232). The invocation may include an instruction to suspend the stateful applications associated with topic 214.

Accordingly, application controller 204 can suspend stateful application 212 (operation 234). The suspension can cause stateful application 212 to stop sending event records to topic 214. Application controller 204 may issue a command facilitated by event-driven platform 200 to suspend stateful application 212. In response, application controller 204 can receive an indication (e.g., a return value of the command) from stateful application 212 indicating the suspension (operation 236). The suspension of stateful application 212 can complete the operations associated with the invocation of application controller 204, which can then return the execution back to proxy 202 (operation 238).

Subsequently, proxy 202 can invoke topic manager 206 (operation 240). The invocation may include an instruction to upscale topic 214 to the new number of partitions, as indicated in the command from the user. Topic manager 206 can then use the APIs to reconfigure topic 214 on event-driven platform 200 to increase the partition count (operation 242). Based on the reconfiguration, event-driven platform 200 can increase the number of partitions of topic 214. This upscaling of topic 214 may be managed and handled by event-driven platform 200. When event-driven platform 200 completes the upscaling process, event-driven platform 200 can indicate, via the APIs, that the process is complete, and the partition count is increased (operation 244).

Similarly, topic manager 206 can use the APIs to reconfigure stateful backup topic 216 on event-driven platform 200 to increase the partition count to match it with the partition count of topic 214 (operation 246). The upscaling of back topic 216 may also be managed and handled by event-driven platform 200. Upon completion, event-driven platform 200 can indicate, via the APIs, that the upscaling process for stateful backup topic 216 is complete, and the partition count is increased (operation 248). The upscaling of topic 214 and stateful backup topic 216 can complete the operations associated with the invocation of topic manager 206, which can then return the execution back to proxy 202 (operation 250).

System 230 can then ensure that the new backup partition of upscaled stateful backup topic 216 allocated to stateful application 212 stores the state of stateful application 212 by redistributing the states (operation 252). The redistribution of the states is further described in conjunction with FIG.

2B. After the redistribution, the state can be accessible to stateful application 212 from the corresponding new backup partition of upscaled stateful backup topic 216. Therefore, stateful application 212 can be ready to resume operation. Proxy 202 can then invoke application controller 204 (operation 254). The invocation may include an instruction to resume the stateful applications associated with topic 214.

Accordingly, application controller 204 can resume stateful application 212 (operation 256). The resumption can cause stateful application 212 to start sending event records to topic 214. Application controller 204 may issue a command to start stateful application 212. In response, application controller 204 can receive an indication from stateful application 212 indicating the resumption (operation 258). The resumption of stateful application 212 can complete the operations associated with the invocation of application controller 204, which can then return the execution back to proxy 202 (operation 260).

Figure 2B:
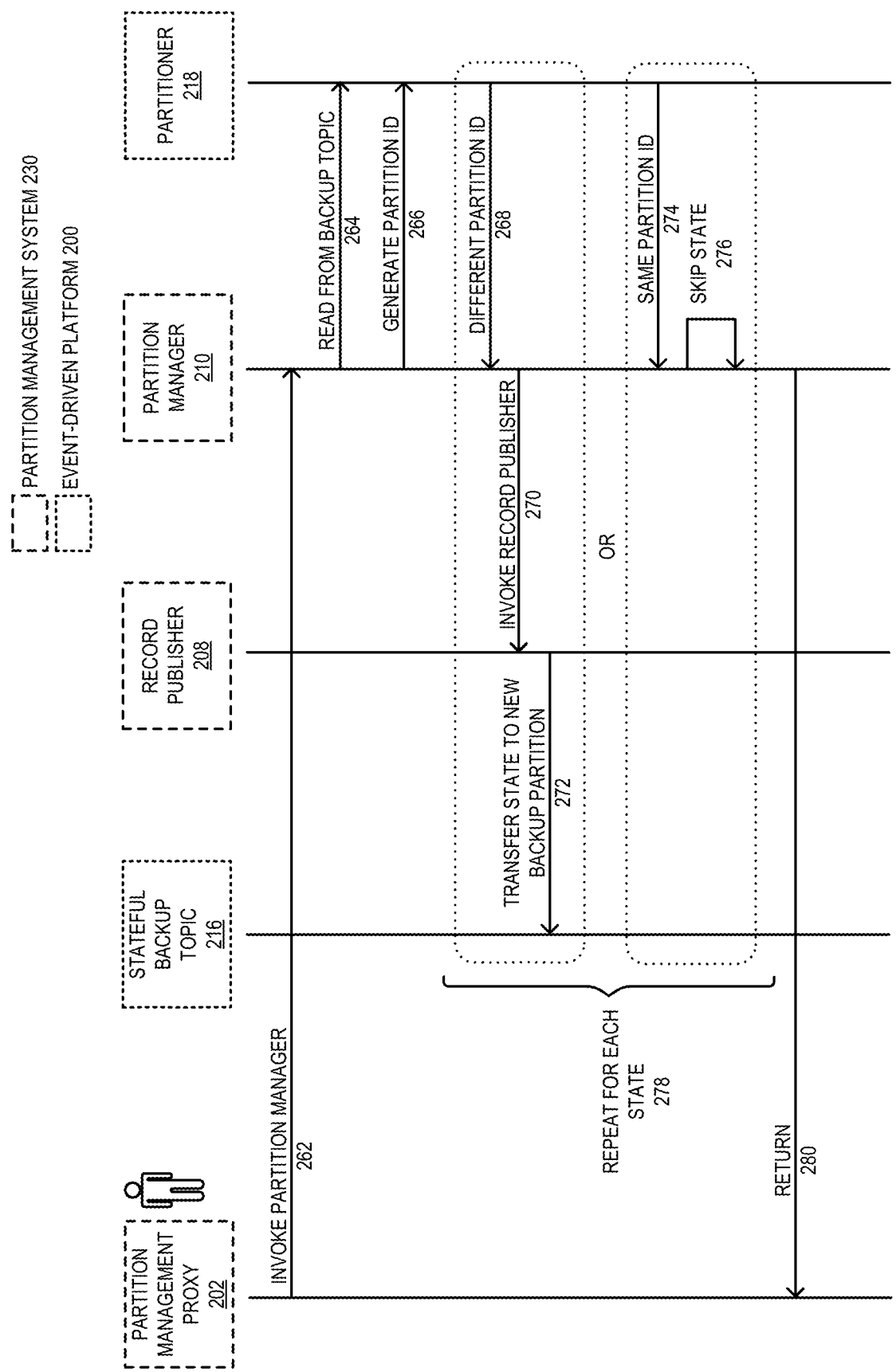
FIG. 2B illustrates an example of redistributing backup states among the increased number of partitions of a topic in an event-driven platform, in accordance with an aspect of the present application.

FIG. 2B illustrates an example of redistributing backup states among the increased number of partitions of a topic in an event-driven platform, in accordance with an aspect of the present application. System 230 can further include a record publisher 208 and a partition manager 210. Here, partition manager 210 can read states from the backup partitions of stateful backup topic 216. To do so, partition manager 210 can incorporate an instance of a partitioner 218 of event-driven platform 200. Partitioner 218 can determine which stateful application is allocated to which partition. Partitioner 218 can implement the hash function that can be applied to associate a stateful application, its record logs, and its state with a corresponding partition and backup partition. Therefore, partition manager 210 can be used to read from stateful backup topic 216. Record publisher 208 can "publish" a record log or state to a partition. The publishing process can include transferring the record log or state to the partition (e.g., from a previous partition).

To redistribute a state, proxy 202 can invoke partition manager 210 (operation 262). The invocation may include an instruction to redistribute the states of stateful backup topic 216. Partition manager 210 can then use partitioner 218 to read a state from a previous backup partition of stateful backup topic 216 (operation 264). It should be noted that the new backup partitions of upscaled stateful backup topic 216 can be empty. Because partitioner 218 can support the hash function, partition manager 210 can also use the hash function to determine a new partition identifier allocated for the state (operation 266).

Based on the new partition identifier, partition manager 210 may determine that the partition identifiers of the previous and new backup partitions are different (operation 268). The difference of the identifiers can indicate that, upon resumption, the corresponding stateful application is to seek the backup copy of its state from a different backup partition. Therefore, partition manager 210 can invoke record publisher 208 (operation 270). The invocation may include an instruction to publish the state to the new backup partition corresponding to the new partition identifier. Based on the invocation, record publisher 208 can transfer the state to the new backup partition of upscaled stateful backup topic 216 (operation 272).

Based on the new partition identifier, partition manager 210 may also determine that the partition identifiers of the previous and new backup partitions are the same (operation 274). Consequently, upon resumption, the corresponding stateful application is to seek the backup copy of its state from the same backup partition. Therefore, partition manager 210 may skip the transfer of the state (operation 276).

Partition manager 210 can repeat the process of generating a partition identifier and publishing the state based on the partition identifier for each state in stateful backup topic 216 (operation 278). When the process is repeated for each state, the redistribution of states can be complete. Partition manager 210 can then return the execution back to proxy 202 (operation 280).

Figure 3A:
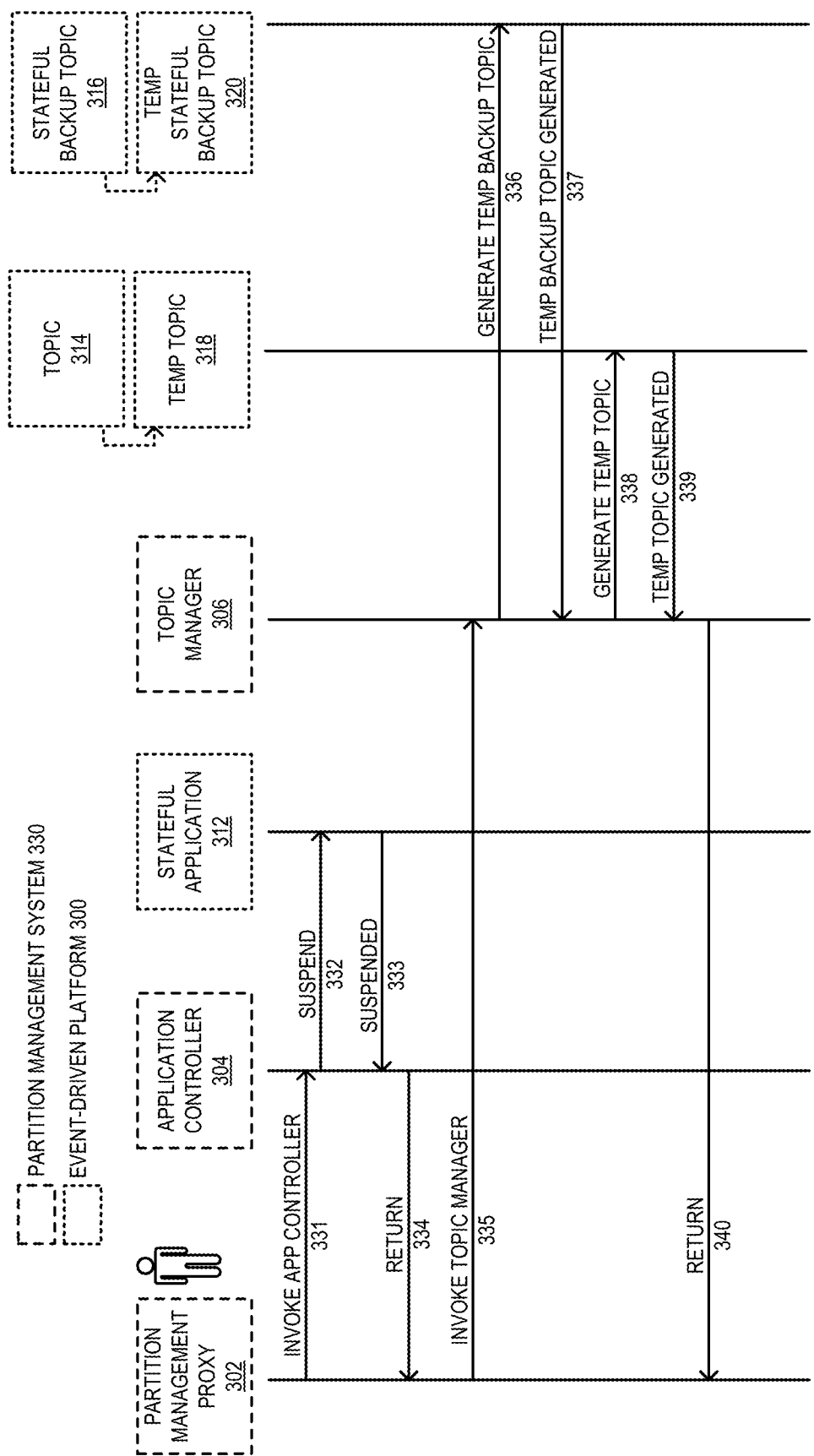
FIG. 3A illustrates an example of a partition management system generating temporary topics for decreasing the number of partitions of a topic in an event-driven platform, in accordance with an aspect of the present application.

FIG. 3A illustrates an example of a partition management system generating temporary topics for decreasing the number of partitions of a topic in an event-driven platform, in accordance with an aspect of the present application. A topic 314 can be defined on an event-driven platform 300. A stateful application 312 can be associated with topic 314. Stateful application 312 can be a producer that sends messages to topic 314 for storing event records. Stateful application 312 can be a stateful application that can maintain a state (e.g., a Kafka StateStore) determined based on the event records. To maintain a backup copy of the state, event-driven platform 300 can internally generate a stateful backup topic 316.

A partition management system 330 can operate in conjunction with event-driven platform 300 to facilitate upscaling and downscaling of topic 314. System 330 can operate with stateful application 312 to facilitate the efficient scaling of topic 314. In some examples, system 330 may be collocated with stateful application 312 and may operate as a root user of stateful application 312. System 230 can include a partition management proxy 302, an application controller 304, and a topic manager 306. Proxy 302 can facilitate an interface between a user (e.g., an administrator managing topic 214) and system 330. Proxy 302 may invoke a respective other component of system 330 used for scaling topic 314. The user can provide a command to upscale topic 314 via proxy 302. The command can include the topic identifier or name of topic 314 and the reduced number of partitions for topic 314. Proxy 302 may present a user interface to the user to obtain the command.

Application controller 304 can suspend and resume a respective stateful application associated with topic 314. Furthermore, topic manager 306 can manage the repartitioning (or altering) topic 314 and stateful backup topic 316. Topic manager 306 can interact with event-driven platform 300 using an API supported by event-driven platform 300. For example, if event-driven platform 300 is based on Kafka, the API can include Kafka administrative APIs. During operation, upon receiving the command from the user, proxy 302 can invoke application controller 304 (operation 331). The invocation may include an instruction to suspend the stateful applications associated with topic 314.

Accordingly, application controller 304 can suspend stateful application 312 (operation 332). The suspension can cause stateful application 312 to stop sending event records to topic 314. Application controller 304 may issue a command facilitated by event-driven platform 300 to suspend stateful application 312. In response, application controller 304 can receive an indication (e.g., a return value of the command) from stateful application 312 indicating the suspension (operation 333). The suspension of stateful application 312 can complete the operations associated with the invocation of application controller 304, which can then return the execution back to proxy 302 (operation 334).

Subsequently, proxy 302 can invoke topic manager 306 (operation 336). The invocation may include an instruction to generate downscaled stateful backup topics for topic 314 and stateful backup topic 316. Topic manager 306 can then use the APIs to generate a temporary stateful backup topic 320 on event-driven platform 300 with the reduced number of partitions (i.e., with the decreased partition count) (operation 336). Temporary stateful backup topic 320 can operate as a placeholder for the states in stateful backup topic 316 during the downscaling of topic 314. Topic manager 306 may issue a command facilitated by the APIs for generating temporary stateful backup topic 320. Based on the command, event-driven platform 300 can generate temporary stateful backup topic 320. When event-driven platform 300 completes the generation process, event-driven platform 300 can indicate, via the APIs, that the process is complete, and temporary stateful backup topic 320 is generated (operation 337).

Furthermore, topic manager 306 can use the APIs to generate a temporary topic 318 on event-driven platform 300 with the reduced number of partitions (operation 338). Temporary topic 318 can operate as a placeholder for the record logs in topic 314 during its downscaling. Topic manager 306 may issue a command facilitated by the APIs for generating temporary topic 318. Based on the command, event-driven platform 300 can generate temporary topic 318. When event-driven platform 300 completes the generation process, event-driven platform 300 can indicate, via the APIs, that the process is complete, and temporary topic 318 is generated (operation 339). When the generation of temporary topic 318 and temporary stateful backup topic 320 are complete, topic manager 306 can return the execution back to proxy 302 (operation 340).

Figure 3B:
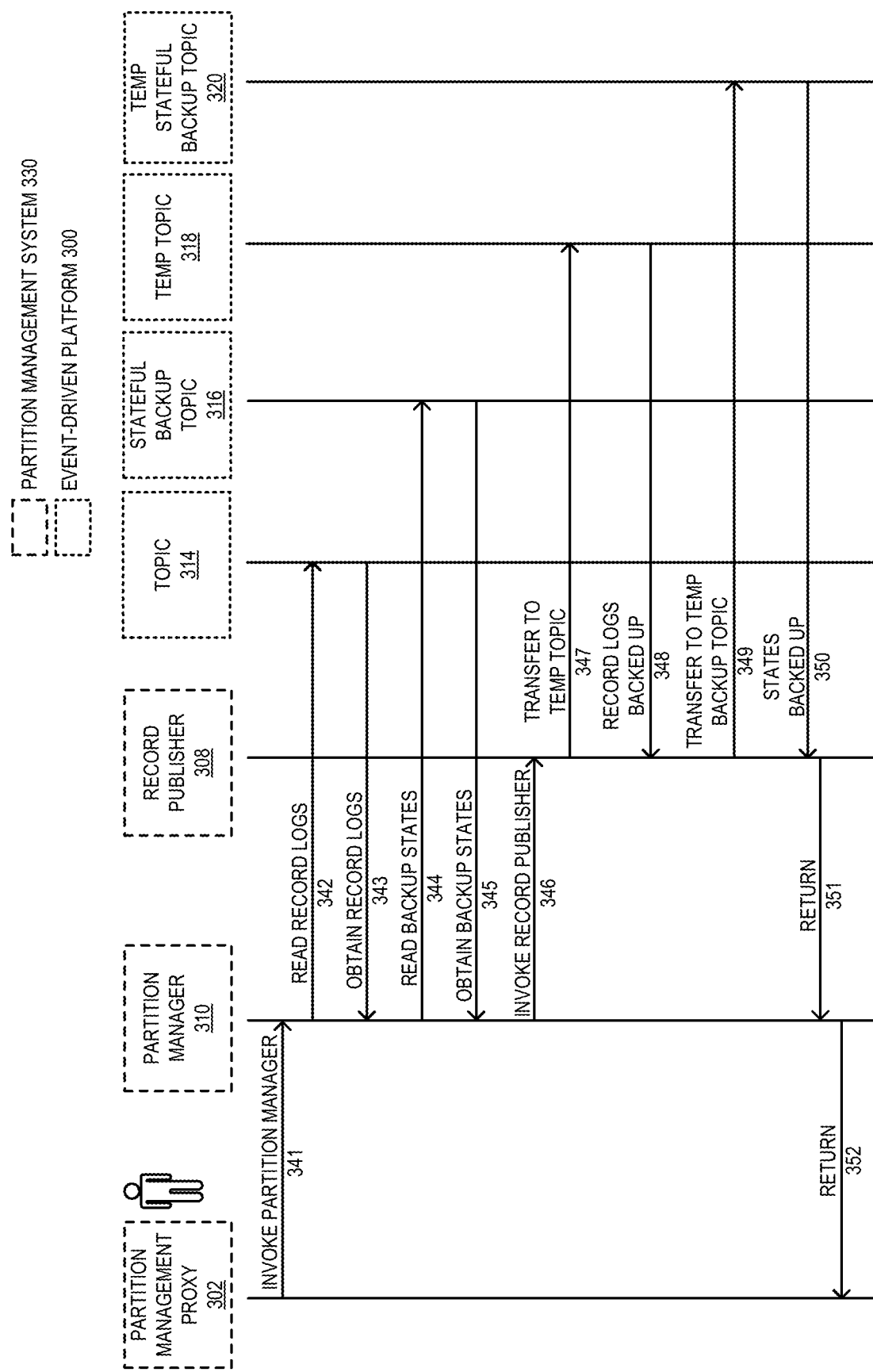
FIG. 3B illustrates an example of a partition management system transferring record logs and states to temporary topics in an event-driven platform, in accordance with an aspect of the present application.

FIG. 3B illustrates an example of a partition management system transferring record logs and states to temporary topics in an event-driven platform, in accordance with an aspect of the present application. System 330 can further include a record publisher 308 and a partition manager 310. Here, partition manager 310 can read record logs from the partitions of topic 314 and states from the backup partitions of stateful backup topic 316. To do so, partition manager 310 can incorporate an instance of a partitioner of event-driven platform 300. The partitioner can implement the hash function that can be applied to associate a stateful application, its record logs, and its state with a corresponding partition and backup partition. Record publisher 308 can publish a record log or state to a partition. The publishing process can include transferring the record log or state to a partition.

To transfer data from topics 314 and 316 to temporary topics 318 and 320, respectively, proxy 302 can invoke partition manager 310 (operation 341). The invocation may include an instruction to transfer record logs of topic 314 to temporary topic 318 and states of stateful backup topic 316 to temporary stateful backup topic 320. Partition manager 310 can then read record logs from topic 316 (operation 342). To do so, partition manager 310 can read from a respective partition of topic 316. Based on the reading, partition manager 310 can obtain the record logs (operation 343). In the same way, partition manager 310 can read the backup copies of the states from the backup partitions of stateful backup topic 316 (operation 344). Based on the reading, partition manager 310 can obtain the backup copies of the states (operation 345).

Upon obtaining the record logs and states from topics 314 and 316, respectively, partition manager 310 is to place the record logs and states in temporary topics 318 and 320, respectively. Therefore, partition manager 310 can invoke record publisher 308 (operation 346). The invocation may include an instruction to publish the record logs and states to the temporary partitions. Based on the invocation, record publisher 308 can transfer the record logs obtained from topic 314 to the temporary partitions of temporary topic 318 (operation 347).

For a respective record log, system 330 can apply the hash function to a key (e.g., an identifier of a corresponding stateful application) of the record log and determine an index. The index can correspond to the number of partitions of temporary topic 318. Record publisher 308 can select which temporary partition a record log should be transferred to based on the index associated with the record log. When the transfer is complete, record publisher 308 can determine that all record logs are backed up in temporary topic 318 (operation 348).

Furthermore, record publisher 308 can also transfer the states obtained from temporary topic 316 and transfer them to the temporary backup partitions of temporary stateful backup topic 320 (operation 349). For a respective state, system 330 can apply the hash function to select which temporary backup partition a state should be transferred. When the transfer is complete, record publisher 308 can determine that all states are backed up in temporary stateful backup topic 320 (operation 350). When the record logs and states are backed up, the operations associated with the invocation of record publisher 308 are complete. Record publisher 308 can then return the execution back to partition manager 310 (operation 351). At this point, partition manager 310 has completed the transfer of record logs from topic 314 to temporary topic 318 and states from stateful backup topic 316 to temporary stateful backup topic 320. Accordingly, partition manager 310 can return the execution back to proxy 302 (operation 352).

Figure 3C:
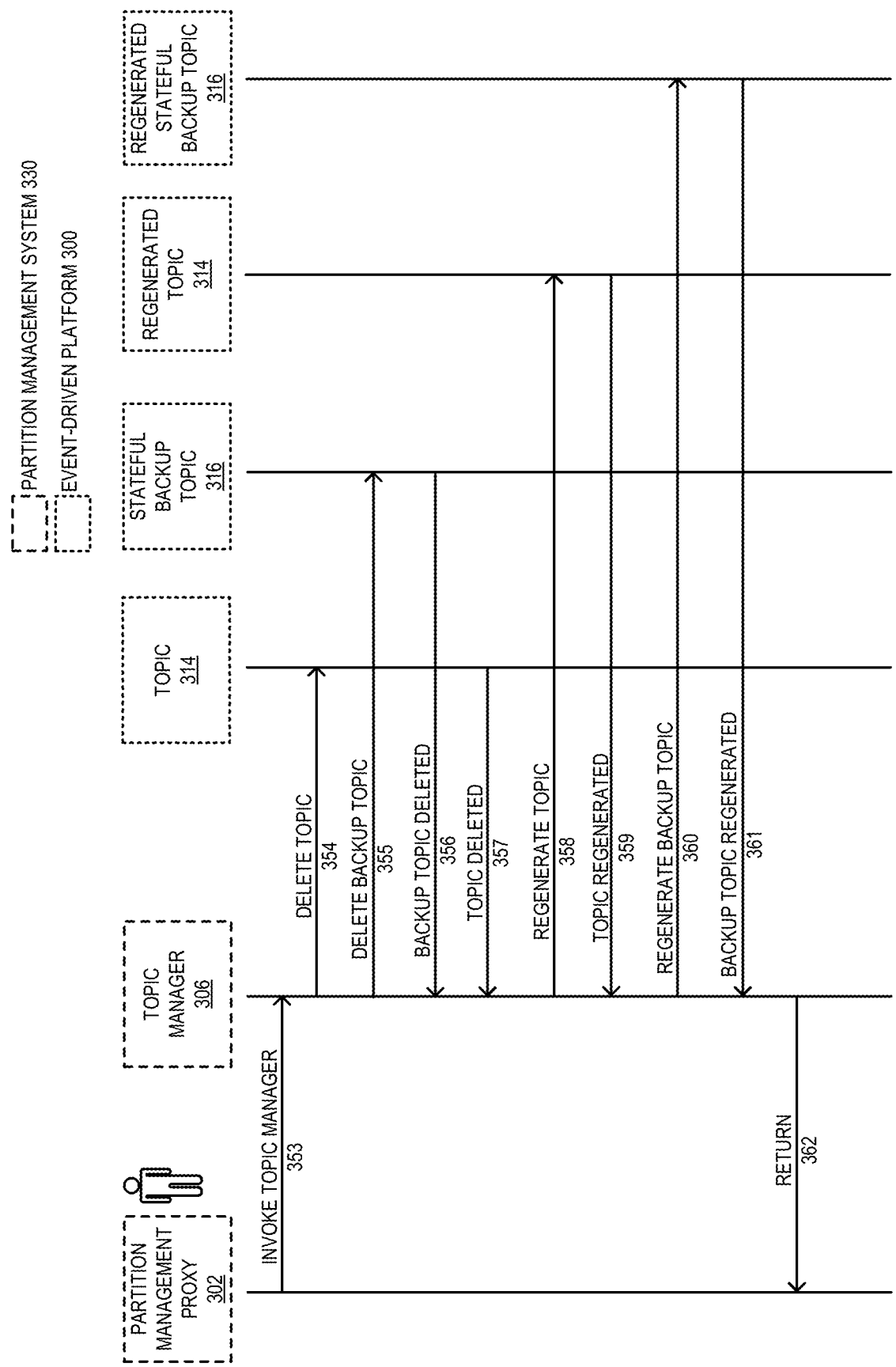
FIG. 3C illustrates an example of a partition management system regenerating topics in an event-driven platform, in accordance with an aspect of the present application.

FIG. 3C illustrates an example of a partition management system regenerating topics in an event-driven platform, in accordance with an aspect of the present application. To downscale topic 314, system 330 can delete topic 314 and stateful backup topic 316 and regenerate them. Therefore, proxy 302 can invoke topic manager 306 (operation 353). The invocation may include an instruction to regenerate downscaled topic 314 and a corresponding downscaled stateful backup topic 316. Topic manager 306 can then use the APIs to delete topic 314 from event-driven platform 300 (operation 354). To ensure correspondence between topic 314 and stateful backup topic 316, topic manager 306 can also delete stateful backup topic 316 from event-driven platform 300 (operation 355).

Topic manager 306 may issue a command facilitated by the APIs for deleting topic 314. Based on the command, event-driven platform 300 can internally delete stateful backup topic 316 and indicate that stateful backup topic 316 is deleted (operation 356). In addition, event-driven platform 300 can also delete topic 314 based on the command and indicate that topic 314 is deleted (operation 357). Deleting topic 314 can free the topic identifier or name of topic 314 for reuse. Therefore, topic 314 can be regenerated on event-driven platform 300 with the same identifier.

Accordingly, topic manager 306 can use the APIs to regenerate topic 314 on event-driven platform 300 with the reduced number of partitions (i.e., with the decreased partition count) (operation 358). Topic manager 306 may issue a command facilitated by the APIs for regenerating topic 314. Based on the command, event-driven platform 300 can generate topic 314 and indicate that topic 314 is regenerated (operation 359). In this way, topic 314 can be regenerated with the same topic identifier and the reduced number of partitions. Furthermore, topic manager 306 can use the APIs to regenerate stateful backup topic 316 on event-driven platform 300 with the reduced number of partitions (operation 360). When event-driven platform 300 completes the generation process, event-driven platform 300 can indicate, via the APIs, that stateful backup topic 316 is regenerated (operation 361). When topic 314 and stateful backup topic 316 are regenerated, topic manager 306 can return the execution back to proxy 302 (operation 362).

Figure 3D:
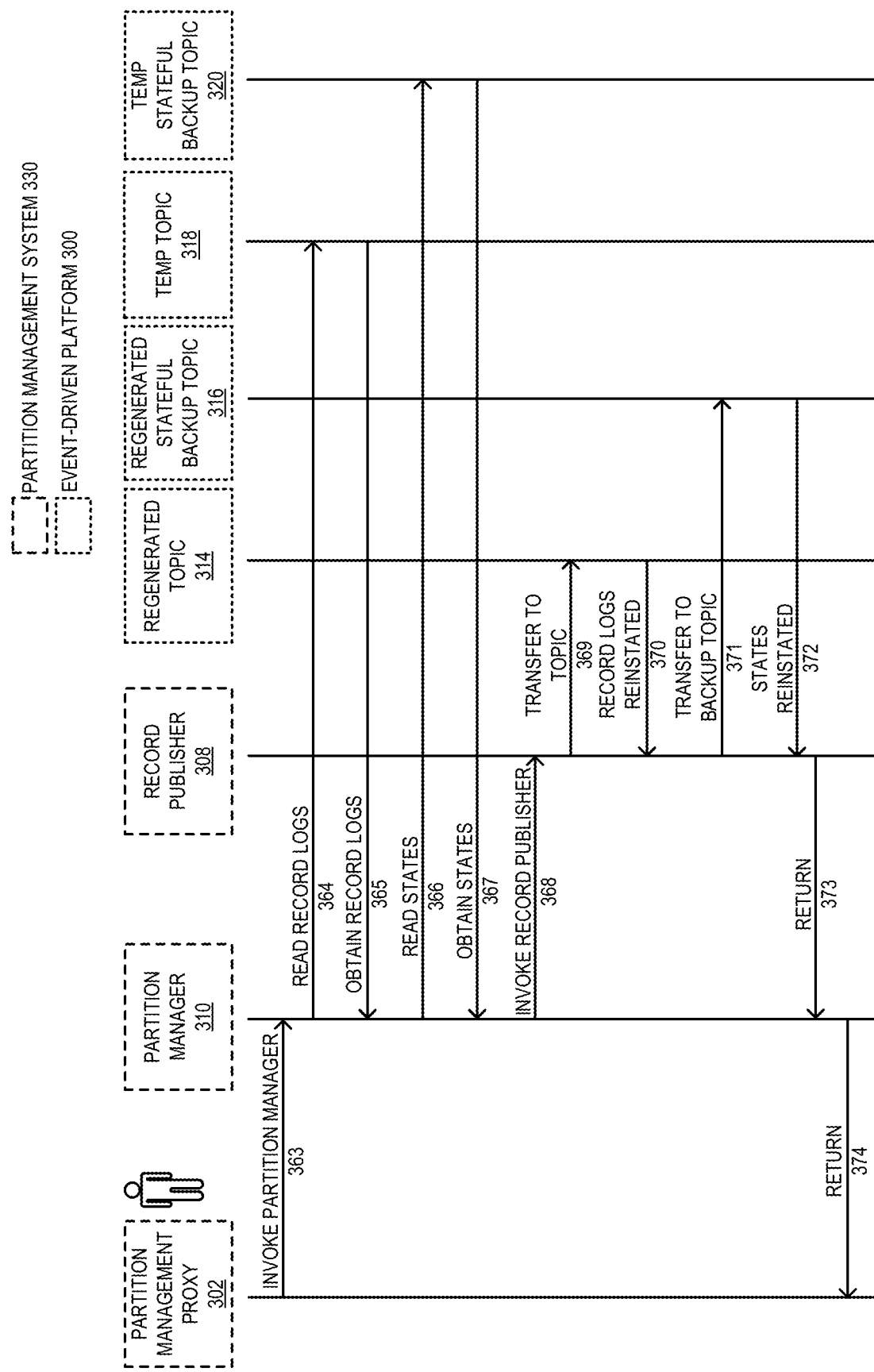
FIG. 3D illustrates an example of a partition management system transferring record logs and states to regenerated topics in an event-driven platform, in accordance with an aspect of the present application.

FIG. 3D illustrates an example of a partition management system transferring record logs and states to regenerated topics in an event-driven platform, in accordance with an aspect of the present application. To transfer data from temporary topics 318 and 320 to regenerated topics 314 and 316, respectively, proxy 302 can invoke partition manager 310 (operation 363). The invocation may include an instruction to transfer record logs of temporary topic 318 to regenerated topic 314 and states of temporary stateful backup topic 320 to stateful backup topic 316. Partition manager 310 can then read record logs from temporary topic 318 (operation 364). To do so, partition manager 310 can read from a respective temporary partition of temporary topic 318. Based on the reading, partition manager 310 can obtain the record logs backed up in temporary topic 318 (operation 365).

In the same way, partition manager 310 can read the states from the temporary backup partitions of temporary stateful backup topic 320 (operation 366). Based on the reading, partition manager 310 can obtain the states (operation 367). Upon obtaining the record logs and states from temporary topics 318 and 320, respectively, partition manager 310 is to place the record logs and states in regenerated topics 314 and 316, respectively. Therefore, partition manager 310 can invoke record publisher 308 (operation 368). The invocation may include an instruction to publish the record logs and states to the regenerated partitions. Based on the invocation, record publisher 308 can transfer the record logs obtained from temporary topic 318 to the partitions of regenerated topic 316 (operation 369).

Because the partitions of regenerated topic 314 and temporary topic 318 have a one-to-one correspondence, the record logs can be transferred between the partitions with the same partition number. For example, the record logs from the nth temporary partition of temporary topic 318 can be transferred to the nth partition of regenerated topic 316. When the transfer is complete, record publisher 308 can determine that all record logs are instated in regenerated topic 316 (operation 370). When the record logs and states are reinstated, the operations associated with the invocation of record publisher 308 are complete. Record publisher 308 can then return the execution back to partition manager 310 (operation 373). At this point, partition manager 310 has completed the transfer of record logs and states to regenerated topic 314 and stateful backup topic 316. Accordingly, partition manager 310 can return the execution back to proxy 302 (operation 374).

Figure 3E:
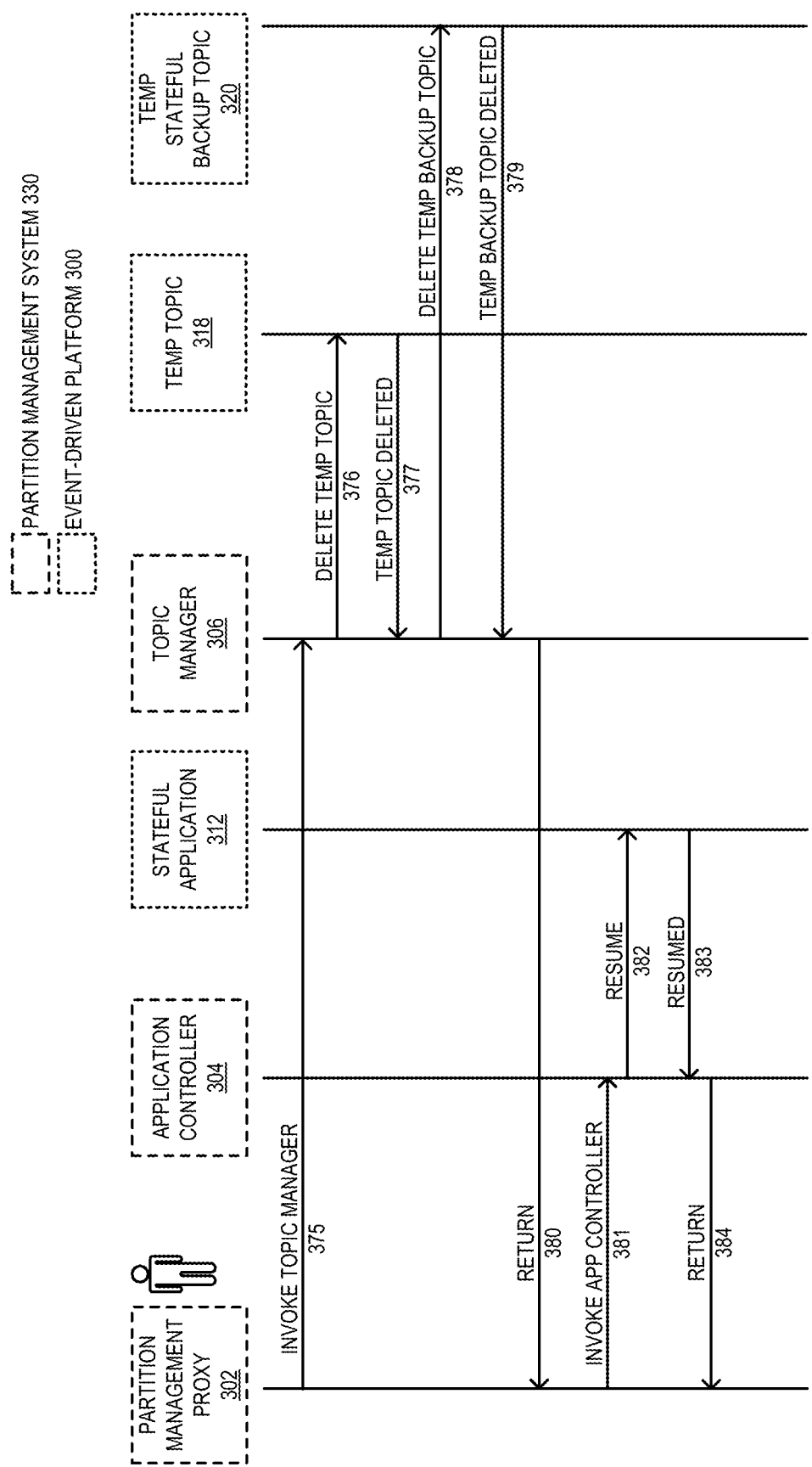
FIG. 3E illustrates an example of a partition management system removing temporary topics in an event-driven platform, in accordance with an aspect of the present application.

FIG. 3E illustrates an example of a partition management system removing temporary topics in an event-driven platform, in accordance with an aspect of the present application. Once the record logs and states are transferred from temporary topic 318 and temporary stateful backup topic 320, these topics may no longer needed. Hence, proxy 302 can invoke topic manager 306 to remove these temporary topics (operation 375). Topic manager 306 can then use the APIs to delete temporary topic 218 from event-driven platform 300 (operation 376). Topic manager 306 may issue a command facilitated by the APIs for removing temporary topic 318. Upon deleting temporary topic 318, event-driven platform 300 can indicate that temporary topic 318 is deleted (operation 377).

Furthermore, topic manager 306 can use the APIs to delete a temporary stateful backup topic 320 from event-driven platform 300 (operation 378). Topic manager 306 may issue a command facilitated by the APIs for generating temporary stateful backup topic 320. Upon deleting temporary stateful backup topic 320, event-driven platform 300 can indicate that temporary stateful backup topic 320 is deleted (operation 379). When temporary topic 318 and temporary stateful backup topic 320 are deleted, topic manager 306 can return the execution back to proxy 302 (operation 380). In this way, system 330 can delete temporary topics 318 and 320 to free the resources of event-driven platform 300.

At this point, stateful application 312 can start sending event records to event-driven platform 300. Therefore, proxy 302 can invoke application controller 304 (operation 381). The invocation may include an instruction to resume the stateful applications associated with topic 314. Application controller 304 can then resume stateful application 312 (operation 382). The resumption can cause stateful application 312 to start sending event records to topic 314. Application controller 304 may issue a command facilitated by event-driven platform 300 to start stateful application 312. In response, application controller 304 can receive an indication from stateful application 312 indicating the resumption (operation 383). The resumption of stateful application 312 can complete the operations associated with the invocation of application controller 304, which can then return the execution back to proxy 302 (operation 384).

Figure 4A:
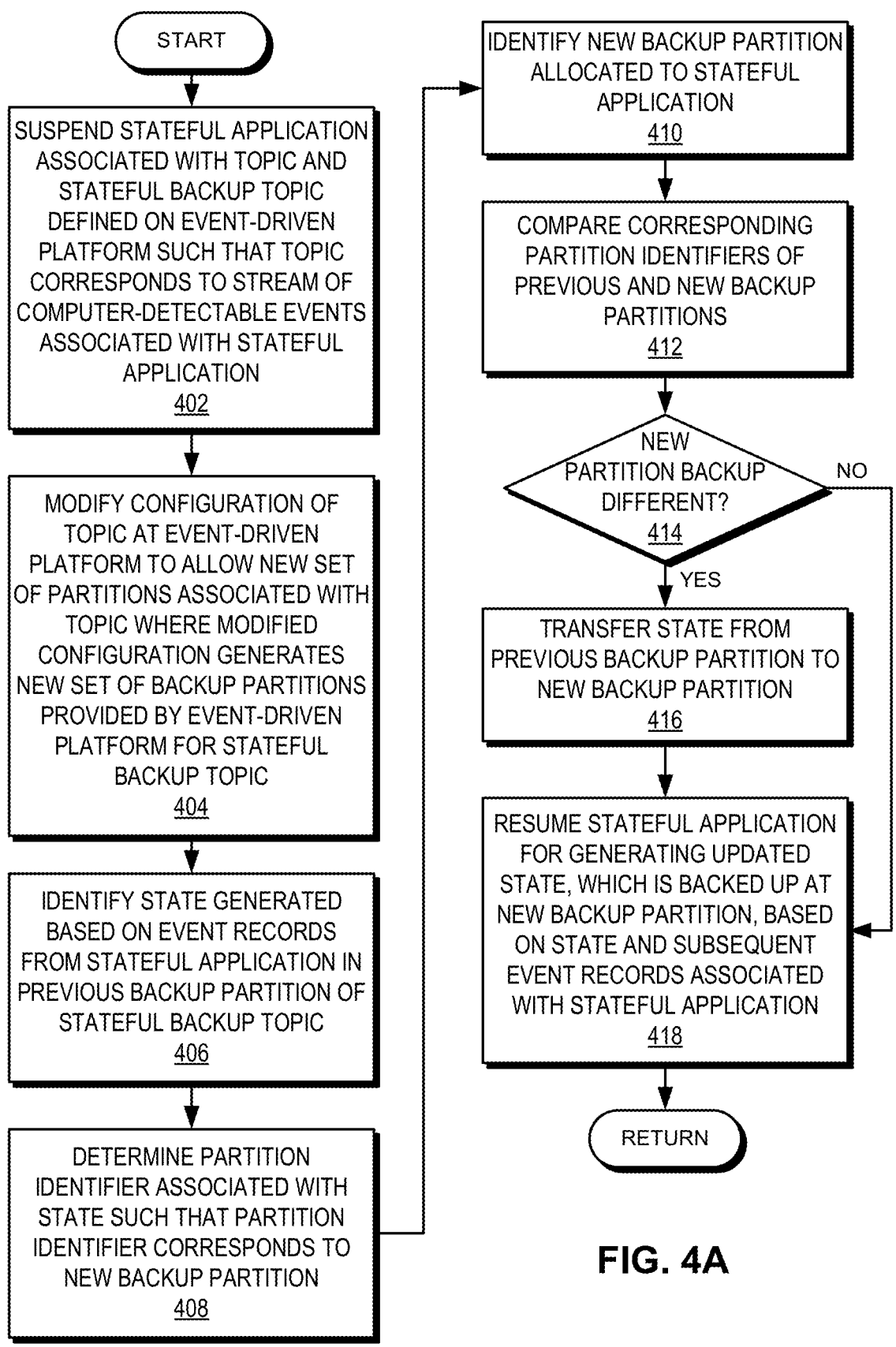
FIG. 4A presents a flowchart illustrating the process of a partition management system upscaling a topic in an event-driven platform, in accordance with an aspect of the present application.

FIG. 4A presents a flowchart illustrating the process of a partition management system upscaling a topic in an event-driven platform, in accordance with an aspect of the present application. During operation, the system can suspend a stateful application associated with a topic and a stateful backup topic defined on an event-driven platform such that the topic corresponds to a stream of computer-detectable events associated with the stateful application (operation 402). The suspension can stop further updates from the stateful application to the event logs. Therefore, the system can perform the upscaling of the topic while the stateful application is suspended. The system can then modify the configuration of the topic at the event-driven platform to allow a set of partitions associated with the topic where the modified configuration generates a new set of backup partitions provided by the event-driven platform for the stateful backup topic (operation 404).

The system can identify the state generated based on the event records from the stateful application in a previous backup partition of the stateful backup topic (operation 406). The previous backup partition can be a partition of the backup partition before the modification of the configuration of the topic. The system can determine a partition identifier associated with the state such that the partition corresponds to the new backup partition (operation 408). The system can apply a hash function for the state based on the new number of partitions, which can be the number of partitions after the modification of the configuration of the topic. Based on the resultant hash value, the system can determine the partition identifier. The system can identify the new backup partition allocated to the stateful application (operation 410). The system can use the partition identifier to identify the new backup partition.

The previous backup partition can also be associated with a partition identifier. The system can compare the corresponding partition identifiers of the previous and new partitions (operation 412). The system can then determine whether the backup new partition is different than the previous backup partition (operation 414). Here, if the partition identifiers of the previous and new partitions are different, the system can determine that the new backup partition is different. If the new backup partition is different, the stateful application has been allocated a new backup partition for its state. Therefore, the system can transfer the state from the previous backup partition to the new backup partition (operation 416).

If the new backup partition has the same partition identifier (operation 414) or upon transferring the state to the new backup partition (operation 416), the system can resume the stateful application for generating an updated state, which is backed up at the new backup partition, based on the state and the subsequent event records associated with the stateful application (operation 418). The new partition can then maintain an updated event log based on the subsequent event records from the producer application. On the other hand, the stateful application can maintain the updated state, which is backed up at the new backup partition, generated based on the state and the subsequent event records. In this way, even when the state is assigned a new backup partition, the stateful application can retrieve the state after resumption.

Figure 4B:
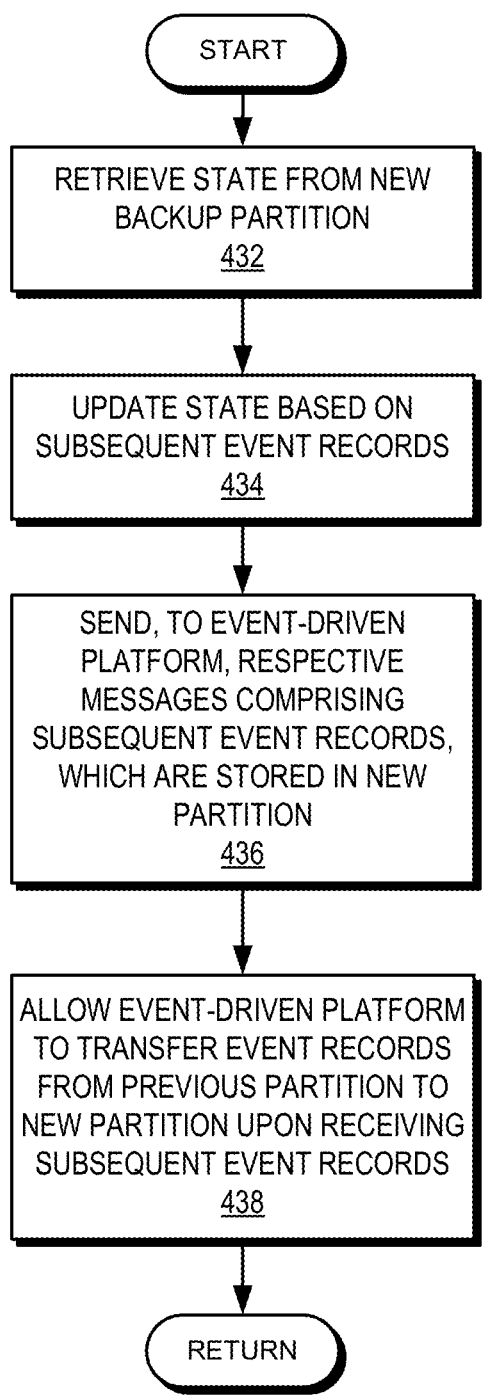
FIG. 4B presents a flowchart illustrating the process of a stateful application updating a state based on a new backup partition in an event-driven platform, in accordance with an aspect of the present application.

FIG. 4B presents a flowchart illustrating the process of a stateful application updating a state based on a new backup partition in an event-driven platform, in accordance with an aspect of the present application. Here, the stateful application can be a resumed stateful application associated with an upscaled topic. During operation, the stateful application can retrieve the state from the new backup partition (operation 432). The system can place the state in the new partition backup partition prior to the resumption of the stateful application. Therefore, the stateful application can retrieve the state from the new partition backup. The system can then update the state based on subsequent event records (operation 434). These subsequent event records can be indicative of the event associated with the application after the resumption of operations.

The stateful application can send, to the event-driven platform, respective messages comprising the subsequent event records, which are stored in the new partition (operation 436). The hash function associated with the stateful application can generate an index associated with the new partition. The system can then allow the event-driven platform to transfer the event records from the previous partition to the new partition upon receiving the subsequent event record (operation 438). When the event-driven platform receives the messages with the subsequent event record, it can determine that a new partition has been allocated to the stateful application based on the hash function. The event-driven platform can then transfer the event log comprising the event records to the new partition to allow the stateful application to incorporate the subsequent event records.

Figure 4C:
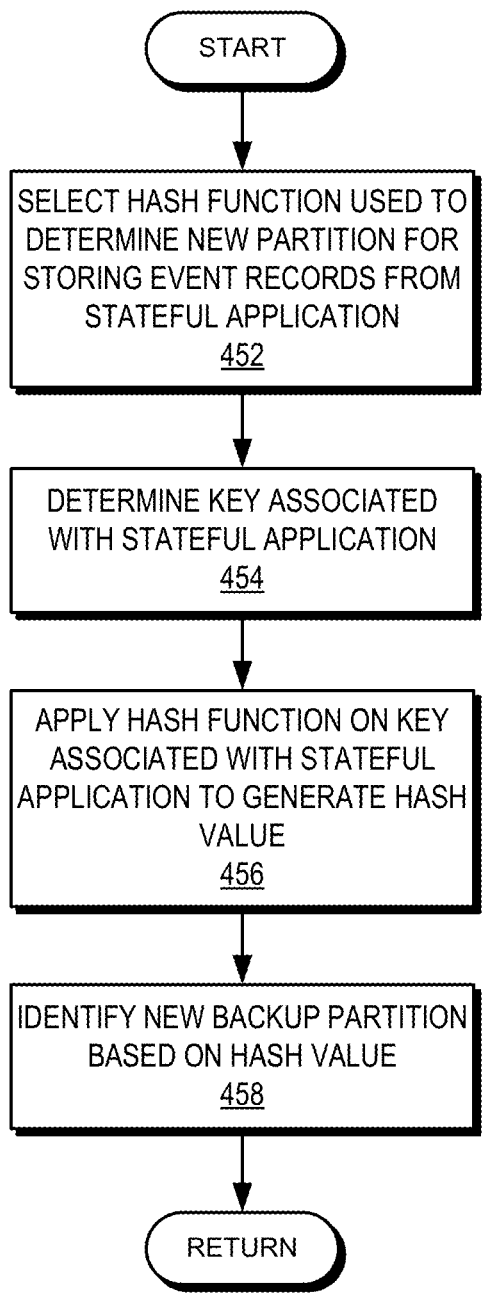
FIG. 4C presents a flowchart illustrating the process of a producer application identifying a new backup partition in an event-driven platform, in accordance with an aspect of the present application.

FIG. 4C presents a flowchart illustrating the process of a stateful application identifying a new backup partition in an event-driven platform, in accordance with an aspect of the present application. The stateful application can select the hash function used to determine the new partition for storing event records from the stateful application (operation 452). There can be multiple hash functions supported by the event-driven platform. The stateful application can select one of the supported ones. However, the stateful application can select the same hash function for identifying a partition of a topic and a backup partition of a stateful backup topic. In this way, the same partition identifier can correspond to the partition and the backup partition.

Upon selecting the hash function, the stateful application can determine a key associated with the stateful application (operation 454). The key can be an identifier of the stateful application. The stateful application can then apply the hash function on the key associated with the stateful application to generate a hash value (operation 456). The hash value can be an index based on which a partition can be selected. Therefore, the index can correspond to a partition identifier. The stateful application can identify the new backup partition based on the hash value (operation 458).

Figure 5A:
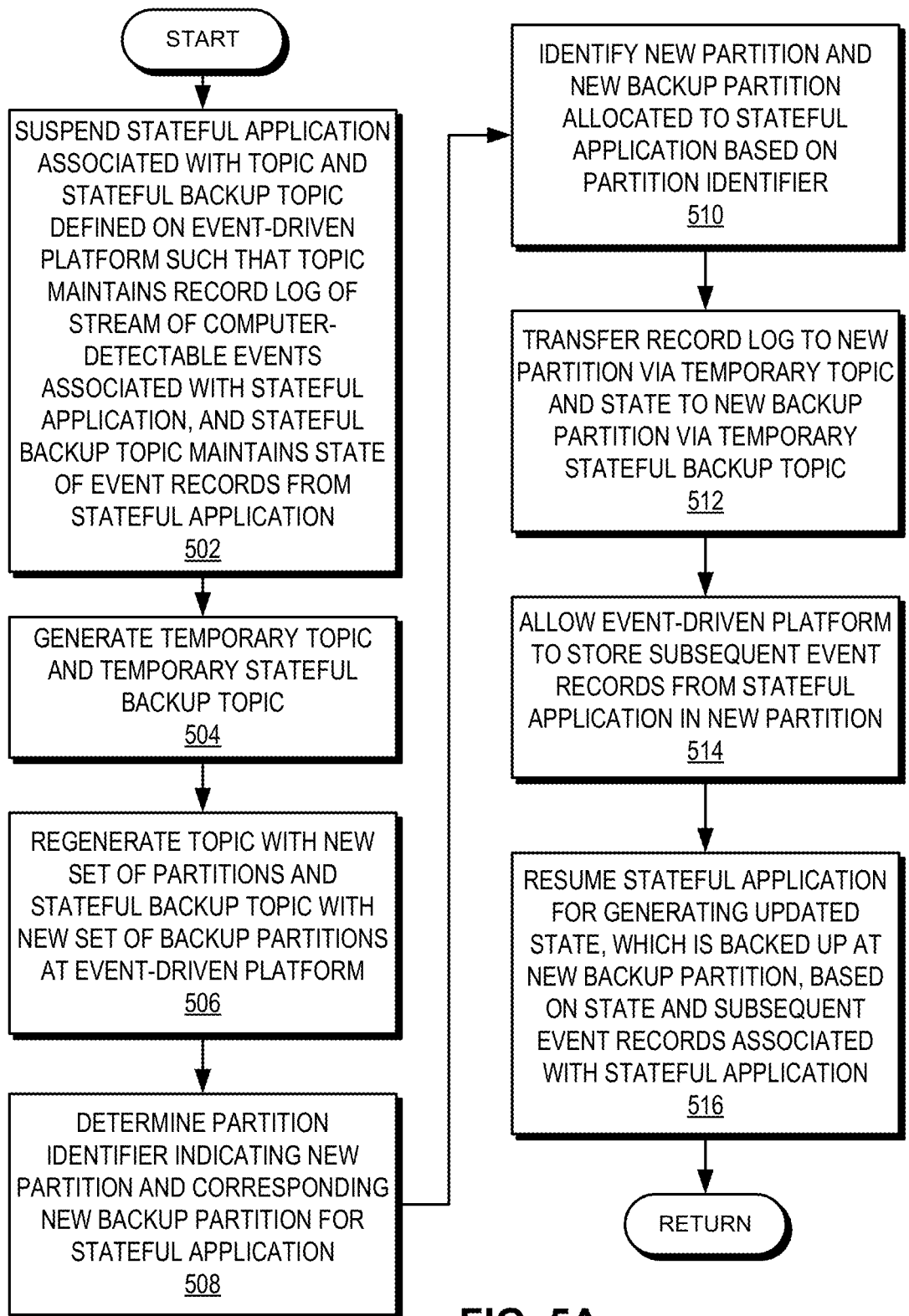
FIG. 5A presents a flowchart illustrating the process of a partition management system downscaling a topic in an event-driven platform, in accordance with an aspect of the present application.

FIG. 5A presents a flowchart illustrating the process of a partition management system downscaling a topic in an event-driven platform, in accordance with an aspect of the present application. During operation, the system can suspend the stateful application associated with a topic and a stateful backup topic defined on the event-driven platform such that the topic maintains a record log of a stream of computer-detectable events from the stateful application, and the stateful backup topic maintains the state of event records from the stateful application (operation 502). The suspension can stop further updates from the stateful application to the event logs. Therefore, the system can perform the downscaling of the topic while the stateful application is suspended.

To accommodate the downscaling of the topic to a reduced number of partitions (e.g., with a reduced partition count), the system can generate a placeholder for transferring the record logs and states in the topic and the stateful backup topic, respectively. Accordingly, the system can generate a temporary topic and a temporary stateful backup topic (operation 504). These temporary topics can be generated with the reduced number of partitions. The system can regenerate the topic with a new set of partitions and the stateful backup topic with a new set of backup partitions at the event-driven platform (e.g., with the reduced number of partitions) (operation 506).

The system can determine a partition identifier indicating a new backup partition and a corresponding new backup partition for the stateful application (operation 508). The system can use a hash function for the stateful application to determine the partition identifier. The system can then identify the new partition and the new backup partition allocated to the stateful application based on the partition identifier (operation 510). The partition identifier can correspond to an index generated within a range indicated by the reduced number of partitions. The system can transfer the record log to the new partition via the temporary topic and the state to a new backup partition via the temporary stateful backup topic (operation 512). Here, the temporary topic and the temporary stateful backup topic can operate as placeholders for the transfer.

The stateful application can send subsequent event records to the event-driven platform. The new partition can allow the event-driven platform to store the subsequent event records from the stateful application in the new partition (operation 514). The subsequent event records can be incorporated into an updated event log of the stateful application maintained in the new partition. The system can resume the stateful application for generating an updated state, which is backed up at the new backup partition, based on the state and the subsequent event records associated with the stateful application (operation 516).

Figure 5B:
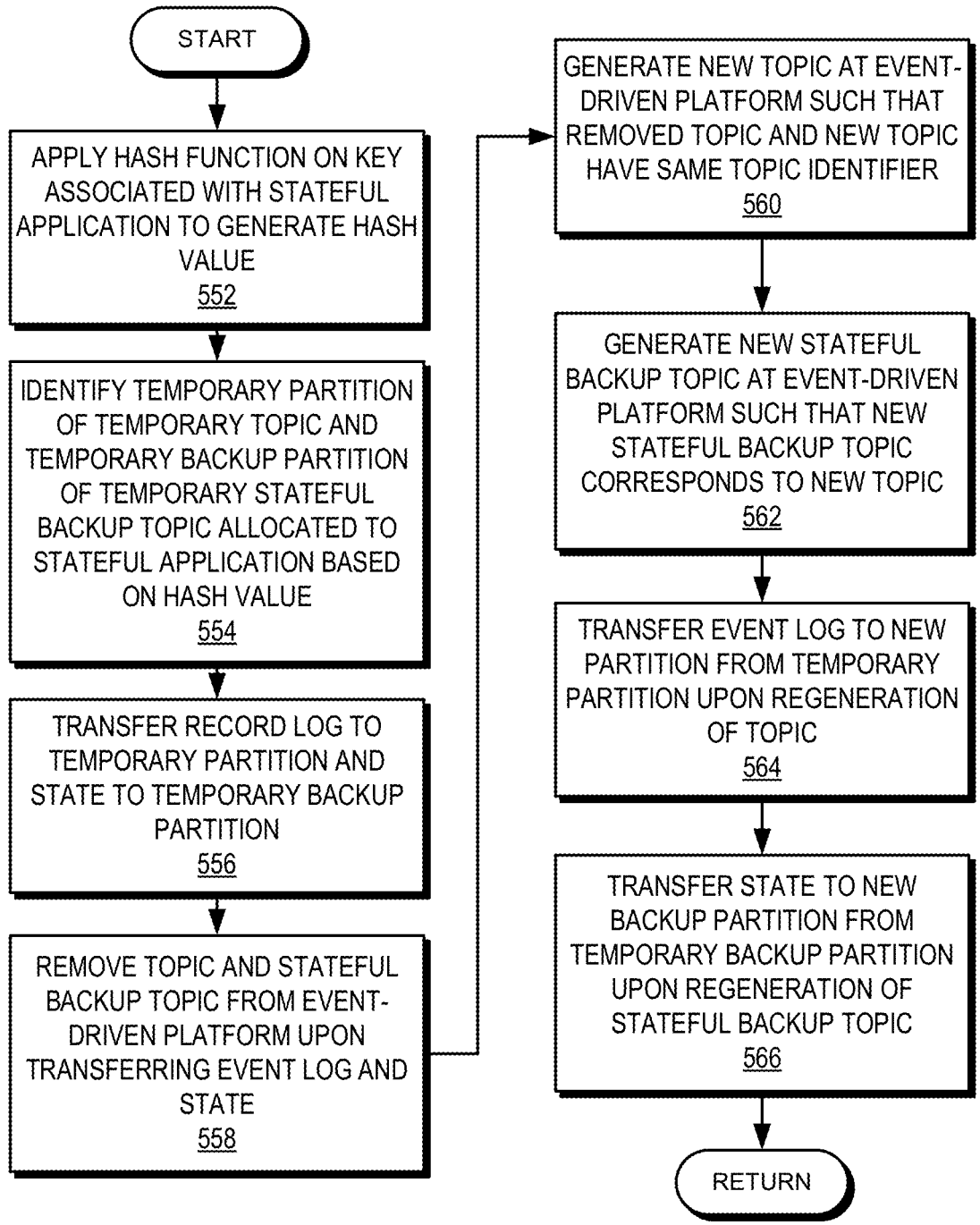
FIG. 5B presents a flowchart illustrating the process of a stateful application distributing record logs and states to regenerated topics in an event-driven platform, in accordance with an aspect of the present application.

FIG. 5B presents a flowchart illustrating the process of a stateful application distributing record logs and states to regenerated topics in an event-driven platform, in accordance with an aspect of the present application. During operation, the application can apply a hash function on a key associated with the stateful application to generate a hash value (operation 552). The key can be an identifier of the stateful application. The hash value can be an index based on which a partition can be selected. Therefore, the index can correspond to a partition identifier. The stateful application can identify a temporary partition of the temporary topic and a temporary backup partition of the temporary stateful backup topic allocated to the stateful application based on the hash value (operation 554).

The system can then transfer the record log to the temporary partition and the state to the temporary backup partition (operation 556). In this way, the system can preserve a copy of the record log and the state during the downscaling of the topic. Since the record log and the state are preserved, the system can remove the topic and the stateful backup topic from the event-driven platform upon transferring the event log and the state (operation 558). The deletion can free the topic identifier at the event-driven platform. Therefore, the topic can be regenerated using the topic identifier.

The system can generate a new topic at the event-driven platform such that the removed topic and the new topic have the same topic identifier (operation 560). In the same way, the system can generate a new stateful backup topic at the event-driven platform such that the new stateful backup topic corresponds to the new topic (operation 562). Because the new topic and the new stateful backup topic can be associated with the topic identifier, the stateful application does not need to be reconfigured. Accordingly, the system can transfer the event log to the new partition from the temporary partition upon regeneration of the topic (operation 564). Similarly, the system can transfer the state to the new backup partition from the temporary backup partition upon regeneration of the stateful backup topic (operation 566).

Figure 5C:
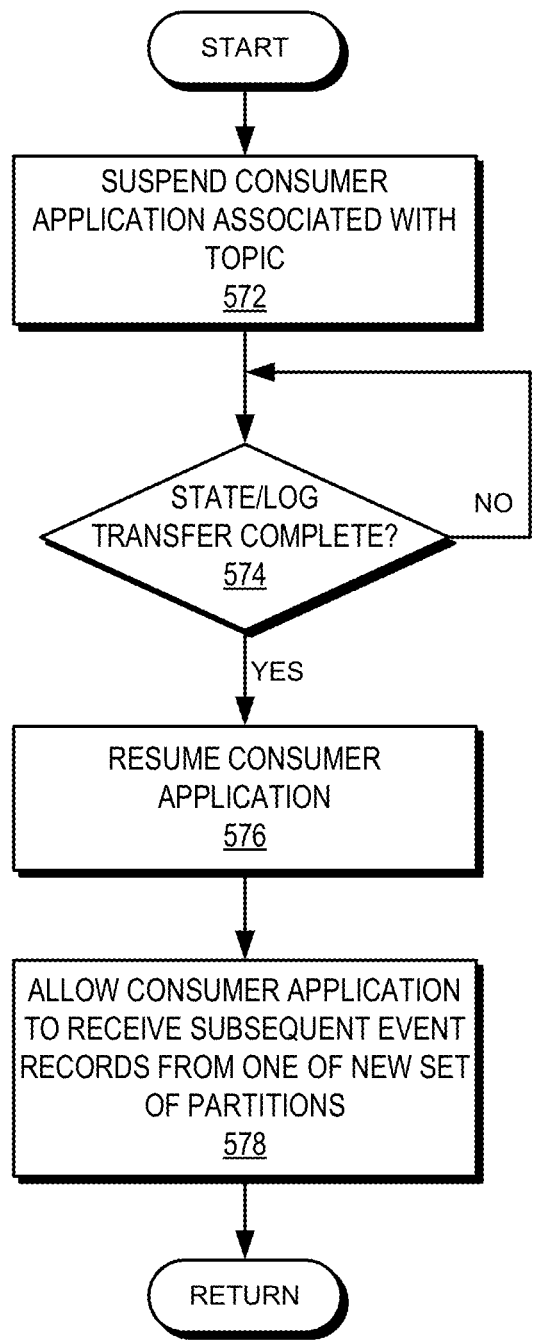
FIG. 5C presents a flowchart illustrating the process of a partition management system resuming consumer applications of a scaled topic in an event-driven platform, in accordance with an aspect of the present application.

FIG. 5C presents a flowchart illustrating the process of a partition management system resuming consumer applications of a scaled topic in an event-driven platform, in accordance with an aspect of the present application. Here, the scaled topic can be either upscaled or downscaled. During operation, the system can suspend a consumer application associated with the topic (operation 572). The suspension can stop the consumer application to retrieve data from the topic. Therefore, the system can perform the scaling of the topic while the consumer application is suspended.

The system can check whether the state or event log transfer is complete (operation 574). Until the transfer is complete, the system can continue the checking. If the transfer is complete, the system can resume the consumer application (operation 576). The consumer application can then retrieve subsequent event records generated by the consumer application. The event records are incorporated into an event log in one of the new set of partitions of the topic. The new set of partitions can be the resultant partitions generated by the upscaling or downscaling of the topic. Accordingly, the system can allow the consumer application to receive the subsequent event records from one of the new set of partitions (operation 578).

Figure 6:
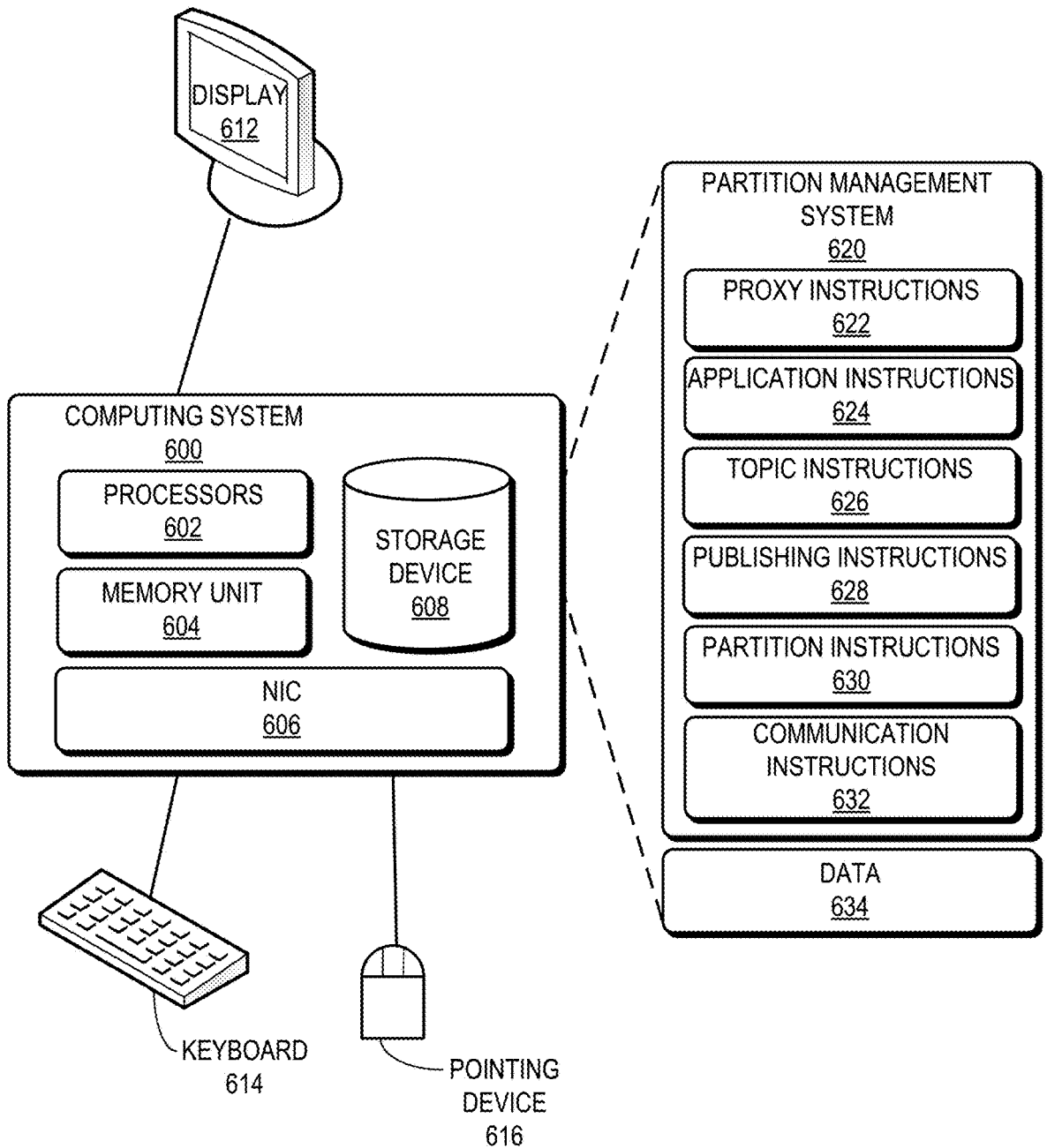
FIG. 6 illustrates an example of a computing system facilitating dynamic topic repartitioning in an event-driven platform, in accordance with an aspect of the present application.

FIG. 6 illustrates an example of a computing system facilitating dynamic topic repartitioning in an event-driven platform, in accordance with an aspect of the present application. A computing system 600 can include a set of processors 602, a memory unit 604, a network interface controller (NIC) 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Computing system 600 can execute a partition management system 620, which can operate in conjunction with an event-driven platform, such as Kafka. Storage device 608 can store data 634 associated with partition management system 620.

Partition management system 620 can include instructions, which when executed by computing system 600, can cause computing system 600 to perform methods and/or processes described in this disclosure. Partition management system 620 can operate in conjunction with an event management system. Furthermore, data 634 can include any data that can facilitate the operations of partition management system 620. data 634 can include, but is not limited to, event records of a respective stateful application, record logs incorporating respective stateful of event records, states generated based on the corresponding stateful of event records, and backup copies of the states maintained by the event-driven platform.

Specifically, partition management system 620 can include instructions for operating a proxy that can operate as a proxy between a user and partition management system 620 (e.g., via user interface) (proxy instructions 622). Partition management system 620 can also include instructions for invoking a respective component of partition management system 620 (proxy instructions 622). Partition management system 620 can further include instructions for suspending and resuming a respective stateful application associated with a topic defined on the event-driven platform (application instructions 624).

Moreover, partition management system 620 can include instructions for configuring the event-driven platform to upscale a topic (topic instructions 626). Partition management system 620 can also include instructions for removing and generating topics and stateful backup topics at the event-driven platform (topic instructions 626). Furthermore, partition management system 620 can include instructions for publishing or transferring event logs to a partition of a topic (publishing instructions 628). Partition management system 620 can also include instructions for publishing or transferring states to a backup partition of a stateful backup topic (publishing instructions 628).

In addition, partition management system 620 can include instructions for generating a partition identifier that can identify a partition or backup partition associated with a stateful application, a record log, or a state (partition instructions 630). Partition management system 620 can also include instructions for applying a hash function on a key associated with a stateful application, a record log, or a state for generating an index, which can correspond to the partition identifier (partition instructions 630). Furthermore, partition management system 620 can include instructions for sending and receiving messages based on respective topics (communication instructions 632).

Figure 7:
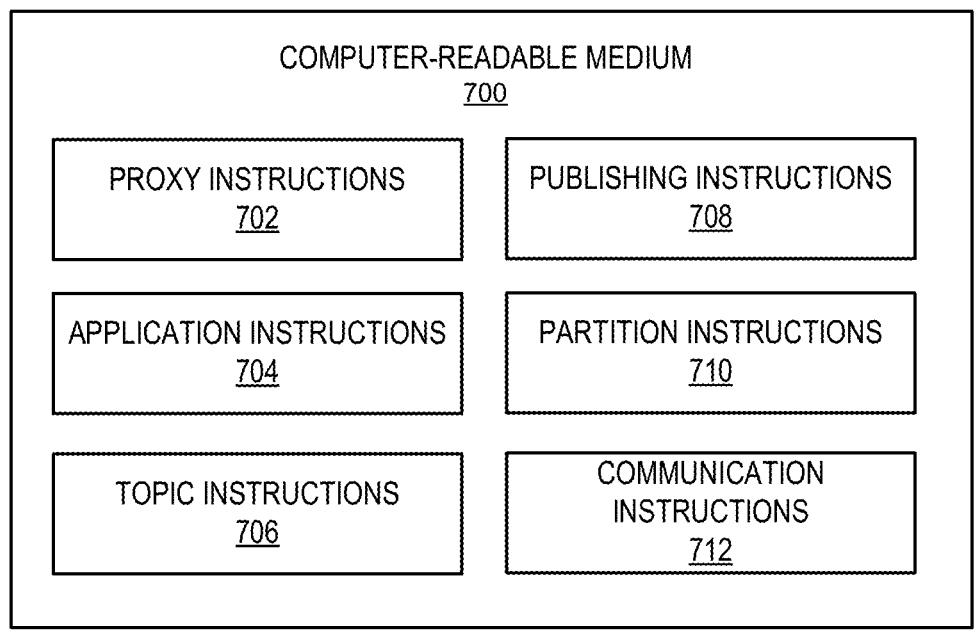
FIG. 7 illustrates an example of a computer-readable medium (CRM) that facilitates dynamic topic repartitioning in an event-driven platform, in accordance with an aspect of the present application.

FIG. 7 illustrates an example of a CRM that facilitates dynamic topic repartitioning in an event-driven platform, in accordance with an aspect of the present application. CRM 700 can be a non-transitory computer-readable medium or device storing instructions that when executed by a computer or processor cause the computer or processor to perform a method. CRM 700 can include proxy instructions 702 for operating a proxy that can operate as a proxy between a user and a partition management system (e.g., via user interface) and invoking a respective component of the partition management system. CRM 700 can include application instructions 704 for suspending and resuming a respective stateful application associated with a topic defined on an event-driven platform.

CRM 700 can also include topic instructions 706 for configuring the event-driven platform to upscale a topic and removing and generating topics and stateful backup topics at the event-driven platform. Furthermore, CRM 700 can include publishing instructions 708 for publishing or transferring event logs to a partition of a topic and states to a backup partition of a stateful backup topic. Moreover, CRM 700 can include partition instructions 710 for generating a partition identifier that can identify a partition or backup partition associated with a stateful application, a record log, or a state. Partition instructions 710 can also be for applying a hash function on a key associated with a stateful application, a record log, or a state for generating an index, which can correspond to the partition identifier. CRM 700 can also include communication instructions 712 for sending and receiving messages based on respective topics.

The description herein is presented to enable any person skilled in the art to make and use the invention and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown but is to be accorded the widest scope consistent with the claims.

One aspect of the present technology can provide a system facilitating scaling of topics on an event-driven platform. During operation, the system can suspend a stateful application associated with a topic and a stateful backup topic defined on the event-driven platform. The topic can correspond to a stream of computer-detectable events associated with the stateful application operating in conjunction with the event-driven platform. The system can then modify the configuration of the topic at the event-driven platform to allow a new set of partitions associated with the topic. The modified configuration generates a new set of backup partitions for the stateful backup topic. The system can identify a state generated based on event records from the stateful application in a previous backup partition of the stateful backup topic and identify a new backup partition allocated to the stateful application. If the previous and new backup partitions are different, the system can transfer the state from the previous backup partition to the new backup partition. The system can then resume the stateful application for generating an updated state, which is maintained at the new backup partition, based on the state and subsequent event records associated with the stateful application.

In an example embodiment, the system can identify the new backup partition by determining a partition identifier associated with the state. The partition identifier can correspond to the new backup partition. The system can determine whether the previous and new backup partitions are different based on corresponding partition identifiers.

In an example embodiment, the system can allow the event-driven platform to retrieve the state from the new backup partition to a new partition corresponding to the new backup partition.

In an example embodiment, the system can allow the event-driven platform to store the subsequent event records from the stateful application in the new partition.

In an example embodiment, the system can allow the event-driven platform to transfer the event records from the previous partition to the new partition in response to receiving a subsequent event record from the stateful application.

In an example embodiment, the system can identify the new backup partition by applying a hash function on a key associated with the stateful application to generate a hash value and identifying the new backup partition based on the hash value.

In an example embodiment, the hash function can be used to determine a new partition for storing event records from the stateful application.

In an example embodiment, the previous and new backup partitions can be generated based on a same partitioning method.

In an example embodiment, the system can suspend a consumer application associated with the topic. Upon transferring the state from the previous backup partition to the new backup partition, the system can resume the consumer application for receiving subsequent event records from one of the new set of partitions.

In an example embodiment, a number of new backup partitions is greater than a number of previous backup partitions of the stateful backup topic.

Another aspect of the present technology can provide a system facilitating scaling of topics on an event-driven platform. During operation, the system can suspend a stateful application associated with a topic and a stateful backup topic defined on an event-driven platform. A partition of the topic maintains an event log of a stream of computer-detectable events associated with the stateful application operating in conjunction with the event-driven platform. The stateful backup topic maintains a state generated based on event records from the stateful application. The system can generate a temporary topic and a temporary stateful backup topic the event-driven platform. The system can then regenerate, at the event-driven platform, the topic with a new set of partitions and the stateful backup topic with a new set of backup partitions. The system can also identify a new partition and a new backup partition allocated to the stateful application and transfer the event log to the new partition via the temporary topic and the state to the new backup partition via the temporary stateful backup topic. The system can then resume the stateful application for generating an updated state, which is maintained at the new backup partition, based on the state and subsequent event records associated with the stateful application.

In an example embodiment, the system can identify the new partition by determining a partition identifier associated with the stateful application. Here, the partition identifier can correspond to the new partition.

In an example embodiment, the system can identify a temporary partition of the temporary topic and a temporary backup partition of the temporary stateful backup topic allocated to the stateful application. The system can then transfer the event log to the temporary partition and the state to the temporary backup partition.

In an example embodiment, the system can regenerate the topic by, upon transferring the event log and the state, removing the topic and the stateful backup topic from the event-driven platform. The system can generate, at the event-driven platform, a new topic such that the removed topic and the new topic have a same topic identifier. The system can also generate, at the event-driven platform, a new stateful backup topic such that the new stateful backup topic corresponds to the new topic.

In an example embodiment, upon regenerating the topic, the system can transfer the event log to the new partition from the temporary partition. Similarly, upon regenerating the stateful backup topic, the system can transfer the state to the new backup partition from the temporary backup partition.

In an example embodiment, the system can identify the temporary partition by applying a hash function on a key associated with the stateful application to generate a hash value and identify the temporary partition based on the hash value.

In an example embodiment, the temporary and new partitions are generated based on a same partitioning method.

In an example embodiment, the system can allow the event-driven platform to store the subsequent event records from the stateful application in the new partition.

In an example embodiment, the system can suspend a consumer application associated with the topic. Upon transferring the event log to the new partition, the system can resume the consumer application for receiving subsequent event records from one of the new set of partitions.

In an example embodiment, a number of new partitions in the regenerated topic is less than a number of previous partitions of the topic.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-implemented method, comprising:
suspending a stateful application associated with a topic and a stateful backup topic defined on an event-driven platform, wherein the topic corresponds to a stream of computer-detectable events associated with the stateful application operating in conjunction with the event-driven platform;
modifying configuration of the topic at the event-driven platform to allow a new set of partitions associated with the topic, wherein the modified configuration generates a new set of backup partitions for the stateful backup topic;
identifying a state generated based on event records from the stateful application in a previous backup partition of the stateful backup topic;
identifying a new backup partition allocated to the stateful application;
in response to the previous and new backup partitions being different, transferring the state from the previous backup partition to the new backup partition; and
resuming the stateful application for generating an updated state, which is maintained at the new backup partition, based on the state and subsequent event records associated with the stateful application.

2. The method of claim 1, wherein identifying the new backup partition further comprises determining a partition identifier associated with the state, wherein the partition identifier corresponds to the new backup partition; and
wherein the method further comprises determining whether the previous and new backup partitions are different based on corresponding partition identifiers.

3. The method of claim 1, further comprising allowing the event-driven platform to retrieve the state from the new backup partition to a new partition corresponding to the new backup partition.

4. The method of claim 3, further comprising allowing the event-driven platform to store the subsequent event records from the stateful application in the new partition.

5. The method of claim 3, further comprising allowing the event-driven platform to transfer the event records from the previous partition to the new partition in response to receiving a subsequent event record from the stateful application.

6. The method of claim 1, wherein identifying the new backup partition comprises:
applying a hash function on a key associated with the stateful application to generate a hash value; and
identifying the new backup partition based on the hash value.

7. The method of claim 6, wherein the hash function is used to determine a new partition for storing event records from the stateful application.

8. The method of claim 1, wherein the previous and new backup partitions are generated based on a same partitioning method.

9. The method of claim 1, further comprising:
suspending a consumer application associated with the topic; and
in response to transferring the state from the previous backup partition to the new backup partition, resuming the consumer application for receiving subsequent event records from one of the new set of partitions.

10. The method of claim 1, wherein a number of new backup partitions is greater than a number of previous backup partitions of the stateful backup topic.

11. A computer-implemented method, comprising:
suspending a stateful application associated with a topic and a stateful backup topic defined on an event-driven platform, wherein a partition of the topic maintains an event log of a stream of computer-detectable events associated with the stateful application operating in conjunction with the event-driven platform, and wherein the stateful backup topic maintains a state generated based on event records from the stateful application;
generating a temporary topic and a temporary stateful backup topic at the event-driven platform;

regenerating, at the event-driven platform, the topic with a new set of partitions and the stateful backup topic with a new set of backup partitions;

identifying a new partition and a new backup partition allocated to the stateful application;

transferring the event log to the new partition via the temporary topic and the state to the new backup partition via the temporary stateful backup topic; and resuming the stateful application for generating an updated state, which is maintained at the new backup partition, based on the state and subsequent event records associated with the stateful application.

12. The method of claim 11, wherein identifying the new partition further comprises determining a partition identifier associated with the stateful application, wherein the partition identifier corresponds to the new partition.

13. The method of claim 11, further comprising:

identifying a temporary partition of the temporary topic and a temporary backup partition of the temporary stateful backup topic allocated to the stateful application; and transferring the event log to the temporary partition and the state to the temporary backup partition.

14. The method of claim 13, wherein regenerating the topic further comprises:

in response to transferring the event log and the state, removing the topic and the stateful backup topic from the event-driven platform;

generating, at the event-driven platform, a new topic such that the removed topic and the new topic have a same topic identifier; and generating, at the event-driven platform, a new stateful backup topic such that the new stateful backup topic corresponds to the new topic.

15. The method of claim 14, further comprising:

in response to regenerating the topic, transferring the event log to the new partition from the temporary partition; and in response to regenerating the stateful backup topic, transferring the state to the new backup partition from the temporary backup partition.

16. The method of claim 13, wherein identifying the temporary partition comprises:

applying a hash function on a key associated with the stateful application to generate a hash value; and identifying the temporary partition based on the hash value.

17. The method of claim 13, wherein the temporary and new partitions are generated based on a same partitioning method.

18. The method of claim 11, further comprising allowing the event-driven platform to store the subsequent event records from the stateful application in the new partition.

19. The method of claim 11, further comprising:

suspending a consumer application associated with the topic; and in response to transferring the event log to the new partition, resuming the consumer application for receiving subsequent event records from one of the new set of partitions.

20. A computer system, comprising:

a processing resource; and a non-transitory computer-readable storage medium storing instructions that when executed by the processing resource cause the computer system to:

suspend a stateful application associated with a topic and a stateful backup topic defined on an event-driven platform, wherein the topic corresponds to a stream of computer-detectable events associated with the stateful application operating in conjunction with the event-driven platform;

modify configuration of the topic at the event-driven platform to allow a new set of partitions associated with the topic, wherein the modified configuration generates a new set of backup partitions for the stateful backup topic;

identify a state generated based on event records from the stateful application in a previous backup partition of the stateful backup topic;

identify a new backup partition allocated to the stateful application;

in response to the previous and new backup partitions being different, transfer the state from the previous backup partition to the new backup partition; and resume the stateful application for generating an updated state, which is maintained at the new backup partition, based on the state and subsequent event records associated with the stateful application.

* * * * *